United States Patent
Pitigoi-Aron et al.

(10) Patent No.: US 10,684,981 B2
(45) Date of Patent: Jun. 16, 2020

(54) FAST TERMINATION OF MULTILANE SINGLE DATA RATE TRANSACTIONS

(71) Applicant: QUALCOMM Incorporated, San Diego, CA (US)

(72) Inventors: Radu Pitigoi-Aron, San Jose, CA (US); Sharon Graif, Zichron Yakov (IL); Richard Dominic Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/381,189

(22) Filed: Apr. 11, 2019

(65) Prior Publication Data

US 2019/0354505 A1    Nov. 21, 2019

Related U.S. Application Data

(60) Provisional application No. 62/672,442, filed on May 16, 2018.

(51) Int. Cl.
     *G06F 13/42*      (2006.01)

(52) U.S. Cl.
     CPC .. *G06F 13/4291* (2013.01); *G06F 2213/0016* (2013.01); *G06F 2213/0038* (2013.01)

(58) Field of Classification Search
     CPC ............... G06F 13/161; G06F 13/4265; G06F 13/4273; G06F 13/4282; G06F 13/4291; G06F 11/08; G06F 11/10; G06F 11/1004; G06F 11/1012; G06F 11/1032; G06F 2213/0016; G06F 2213/0038; G06F 2213/0064
See application file for complete search history.

(56) References Cited

U.S. PATENT DOCUMENTS

| 2006/0067123 | A1* | 3/2006 | Jigour | G11C 7/1045 365/185.05 |
| 2008/0222320 | A1* | 9/2008 | Suganuma | G06F 13/4269 710/35 |
| 2012/0017025 | A1* | 1/2012 | Luk | G06F 13/4282 710/313 |
| 2013/0262948 | A1* | 10/2013 | Takehara | G06F 11/08 714/747 |
| 2014/0269065 | A1* | 9/2014 | Jigour | G11C 29/04 365/185.09 |

(Continued)

OTHER PUBLICATIONS

"Introduction to the MIPI I3C Standardized Sensor Interface". Aug. 2016. MIPI Alliance. (Year: 2016).*

(Continued)

*Primary Examiner* — Thomas J. Cleary
(74) *Attorney, Agent, or Firm* — Loza & Loza LLP

(57) ABSTRACT

Systems, methods, and apparatus are described that enable a serial bus to be operated in one or more modes that employ additional wires for communicating data. A method includes providing a data payload for a first data frame to be transmitted over a plurality of data lanes of a multilane serial bus operated in accordance with an I3C protocol, providing one or more indicators of validity of one or more bytes included in the data payload, and transmitting the first data frame over the multilane serial bus in accordance with a clock signal transmitted on a clock lane of the multilane serial bus.

29 Claims, 20 Drawing Sheets

(56) References Cited

U.S. PATENT DOCUMENTS

| | | | |
|---|---|---|---|
| 2014/0269954 A1* | 9/2014 | Whitby-Strevens | ........................... H04L 25/03866 375/259 |
| 2015/0281871 A1* | 10/2015 | Poulsen | .................. H04L 69/08 370/328 |
| 2015/0370735 A1* | 12/2015 | Pitigoi-Aron | ......... G06F 13/364 710/110 |
| 2017/0141794 A1* | 5/2017 | Tyson | .................. H03M 13/091 |
| 2017/0308306 A1* | 10/2017 | Intrater | .................. G06F 3/0611 |
| 2018/0046595 A1* | 2/2018 | Pitigoi-Aron | ....... G06F 13/4295 |
| 2018/0189222 A1* | 7/2018 | Srivastava | ............ G06F 13/287 |
| 2018/0225251 A1* | 8/2018 | Sthoeger | ............... G06F 13/423 |
| 2019/0049513 A1* | 2/2019 | Azam | ................ G01R 31/2803 |
| 2019/0095273 A1* | 3/2019 | Graif | .................... G06F 13/4291 |
| 2019/0130845 A1* | 5/2019 | Han | ....................... G06F 3/0412 |
| 2019/0171609 A1* | 6/2019 | Mishra | .................... G06F 13/24 |
| 2019/0220436 A1* | 7/2019 | Pitigoi-Aron | ....... G06F 13/4282 |
| 2019/0266122 A1* | 8/2019 | Pitigoi-Aron | ....... G06F 13/4291 |
| 2019/0356412 A1* | 11/2019 | Pitigoi-Aron | ....... G06F 13/4282 |

OTHER PUBLICATIONS

"SD Specifications Part 1 Physical Layer Simplified Specification". Version 6.00. Apr. 10, 2017. SD Card Association. (Year: 2017).*
"Enhanced Serial Peripheral Interface (eSPI) Interface Base Specification (for Client and Server Platforms)". Revision 1.0. Jan. 2016. Intel Corporation (Year: 2016).*

* cited by examiner

US 10,684,981 B2

FAST TERMINATION OF MULTILANE SINGLE DATA RATE TRANSACTIONS

PRIORITY CLAIM

This application claims priority to and the benefit of U.S. Provisional Patent Application Ser. No. 62/672,442 filed in the U.S. Patent Office on May 16, 2018, the entire content of this application being incorporated herein by reference as if fully set forth below in its entirety and for all applicable purposes.

TECHNICAL FIELD

The present disclosure relates generally to an interface between processing circuits and peripheral devices and, more particularly, to optimizing data communication throughput on a serial bus.

BACKGROUND

Mobile communication devices may include a variety of components including circuit boards, integrated circuit (IC) devices and/or System-on-Chip (SoC) devices. The components may include processing circuits, user interface components, storage and other peripheral components that communicate through a serial bus. The serial bus may be operated in accordance with a standardized or proprietary protocol.

In one example, the Inter-Integrated Circuit serial bus, which may also be referred to as the I2C bus or the I²C bus, is a serial single-ended computer bus that was intended for use in connecting low-speed peripherals to a processor. In some examples, a serial bus may employ a multi-master protocol in which one or more devices can serve as a master and a slave for different messages transmitted on the serial bus. Data can be serialized and transmitted over two bidirectional wires, which may carry a data signal, which may be carried on a Serial Data Line (SDA), and a clock signal, which may be carried on a Serial Clock Line (SCL).

In another example, the protocols used on an I3C bus derives certain implementation aspects from the I2C protocol. The I3C bus are defined by the Mobile Industry Processor Interface Alliance (MIPI). Original implementations of I2C supported data signaling rates of up to 100 kilobits per second (100 kbps) in standard-mode operation, with more recent standards supporting speeds of 400 kbps in fast-mode operation, and 1 megabit per second (Mbps) in fast-mode plus operation.

As applications have become more complex, demand for throughput over the serial bus can escalate and capacity may be strained or exceeded. Multilane capabilities may be added to a serial bus, whereby more than two wires are used to couple devices. In one example, a first line carries a clock signal while two or more wires carry data timed in accordance with the clock signal. Multilane implementations can improve throughput for large transactions, but can increase latency when multilane data frames include padding.

SUMMARY

Certain aspects of the disclosure relate to systems, apparatus, methods and techniques that support bus width expansion on a dynamic basis. Certain aspects relate to serial bus including a serial bus that may be operated in an I3C single data rate (SDR) mode of operation, an I3C double data rate (DDR) mode of operation, and/or an I3C ternary encoding mode of operation.

In various aspects of the disclosure, a method includes providing a data payload for a first data frame to be transmitted over a plurality of data lanes of the multilane serial bus, providing one or more indicators of validity of one or more bytes included in the data payload, and transmitting the first data frame over the multilane serial bus in accordance with a clock signal transmitted on a clock lane of the multilane serial bus. Control bits may be transmitted using the plurality of data lanes of the multilane serial bus during transmission of the first data frame.

In one aspect, the first data frame is a read frame and the one or more repurposed bit fields are transmitted while a breakpoint field is transmitted after the data payload.

In certain aspects, the first data frame is a read frame and the one or more indicators of validity are transmitted while a breakpoint field is transmitted in a preceding second data frame. The method may include transmitting the breakpoint field on a first data lane to terminate the preceding second data frame, and transmitting the one or more indicators of validity on at least one additional data lane concurrently with the breakpoint field.

In certain aspects, the first data frame is a write frame and the one or more indicators of validity are transmitted concurrently with parity information prior to transmission of the data payload. The method may include transmitting parity information for a first byte on a first data lane during a final clock cycle of an immediately preceding second data frame, and causing a transition in signaling state on a second data lane during transmission of the parity information for the first byte.

In certain aspects, the multilane serial bus has a primary data lane and three additional data lanes, and wherein a fully-loaded data frame carries four bytes as a data payload. The method may include providing fewer than four valid data bytes as data payload, and provide the one or more indicators by causing a transition in signaling state on at least one data lane during transmission of parity information in an immediately preceding second data frame. The data payload may be provided by providing fewer than four valid data bytes as data payload, and providing the one or more indicators by causing a transition in signaling state on at least one data lane during transmission of a breakpoint field in an immediately preceding second data frame. The method may include terminating transmission of the first data frame after transmitting the fewer than four valid data bytes.

In various aspects of the disclosure, an apparatus operable to communicate over a multilane serial bus has a processor and a bus interface configured to couple the apparatus to the multilane serial bus, which has a first data lane line and one or more additional data lanes. The processor may be configured to provide a data payload for a first data frame to be transmitted over a plurality of data lanes of a multilane serial bus, provide one or more indicators of validity of one or more bytes included in the data payload, and transmit the first data frame over the multilane serial bus in accordance with a clock signal transmitted on a clock lane of the multilane serial bus. Control bits may be transmitted using the plurality of data lanes of the multilane serial bus during transmission of the first data frame.

In various aspects of the disclosure, an apparatus operable to communicate over a multilane serial bus has means for providing a data payload for a first data frame to be transmitted over a plurality of data lanes of a multilane serial bus, means for providing one or more indicators of validity of one or more bytes included in the data payload, and means for transmitting the first data frame over the multilane serial bus in accordance with a clock signal transmitted on a clock lane of the multilane serial bus. Control bits may be transmitted using the plurality of data lanes of the multilane serial bus during transmission of the first data frame.

In various aspects of the disclosure, a processor-readable storage medium having one or more instructions related to multilane communications which, when executed by at least one processor of a processing circuit, cause the processing circuit to provide a data payload for a first data frame to be transmitted over a plurality of data lanes of a multilane serial bus, provide one or more indicators of validity of one or more bytes included in the data payload, and transmit the first data frame over the multilane serial bus in accordance with a clock signal transmitted on a clock lane of the multilane serial bus. Control bits may be transmitted using the plurality of data lanes of the multilane serial bus during transmission of the first data frame.

DETAILED DESCRIPTION

Figure 1:
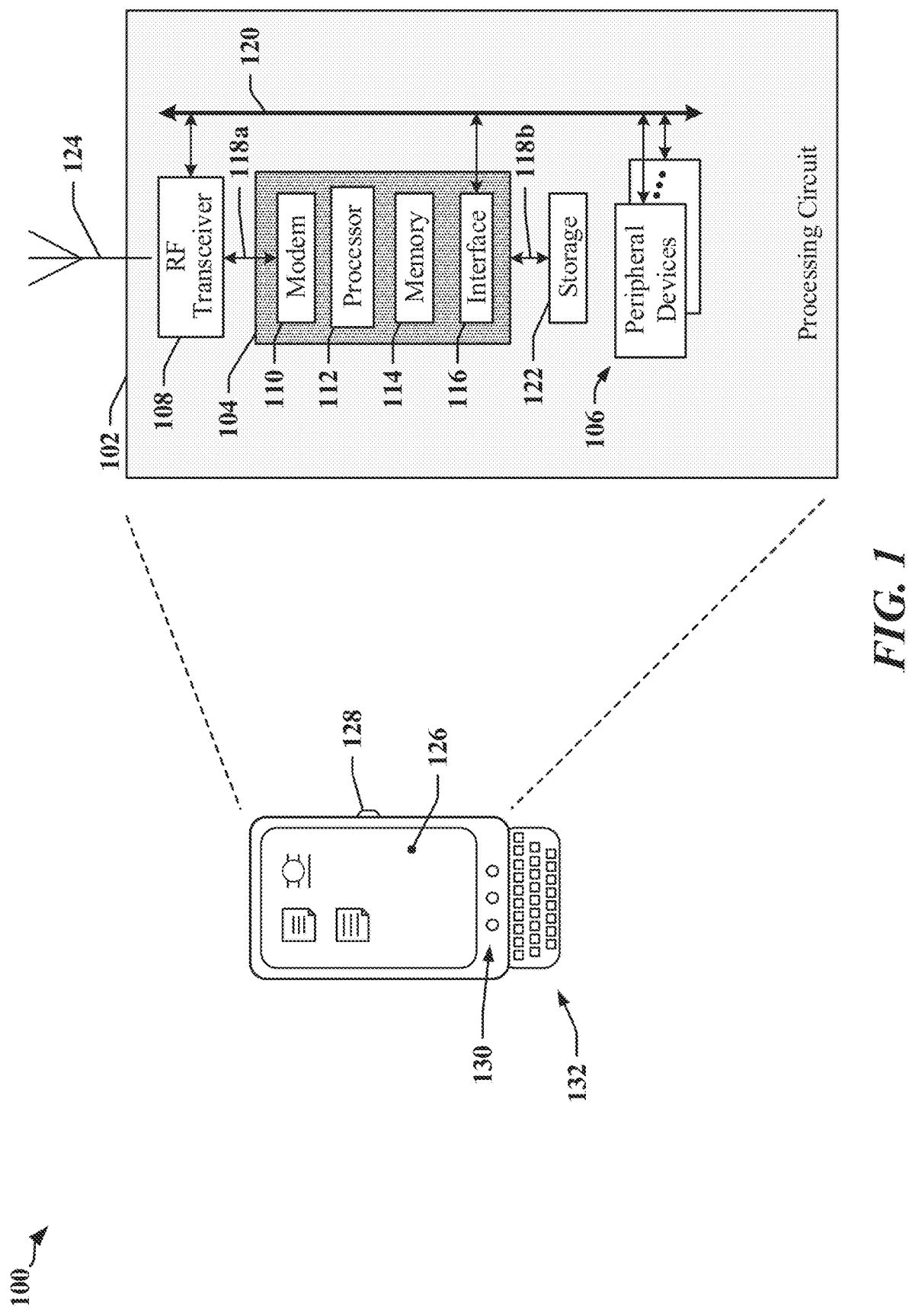
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoC and other IC devices often employ a serial bus to connect application processor or other host device with modems and other peripherals. The serial bus may be operated in accordance with specifications and protocols defined by a standards body. The serial bus may be operated in accordance with a standard or protocol such as the I2C, I3C, serial low-power inter-chip media bus (SLIMbus), system management bus (SMB), radio frequency front-end (RFFE) protocols that define timing relationships between signals and transmissions. Certain aspects disclosed herein relate to systems, apparatus, methods and techniques that provide a mechanism that can be used on a serial bus to dynamically extend the bus width and thereby improve bandwidth and/or throughput. When the bus width is extended, data blocks or frames may be terminated early when insufficient data is available to form a complete data payload. Early termination can improve bus latency.

In this disclosure, the terms data block and data frame may be interchangeably used when describing a unit of data transferred over a serial bus. In one example, the data block/data frame includes one 16-bit word when transmitted using a single data wire of a serial bus operated in accordance with an I3C HDR DDR protocol. In another example, the data block/data frame can carry two 16-bit words when transmitted using two data wires of a multi-lane serial bus operated in accordance with an I3C HDR DDR protocol. In another example, the data block/data frame can carry four 16-bit words when transmitted using four data wires of a multi-lane serial bus operated in accordance with an I3C HDR DDR protocol.

Example of an Apparatus with a Serial Data Link

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similarly functioning device.

FIG. 1 illustrates an example of an apparatus 100 that may employ a data communication bus. The apparatus 100 may include an SoC a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, and other devices through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
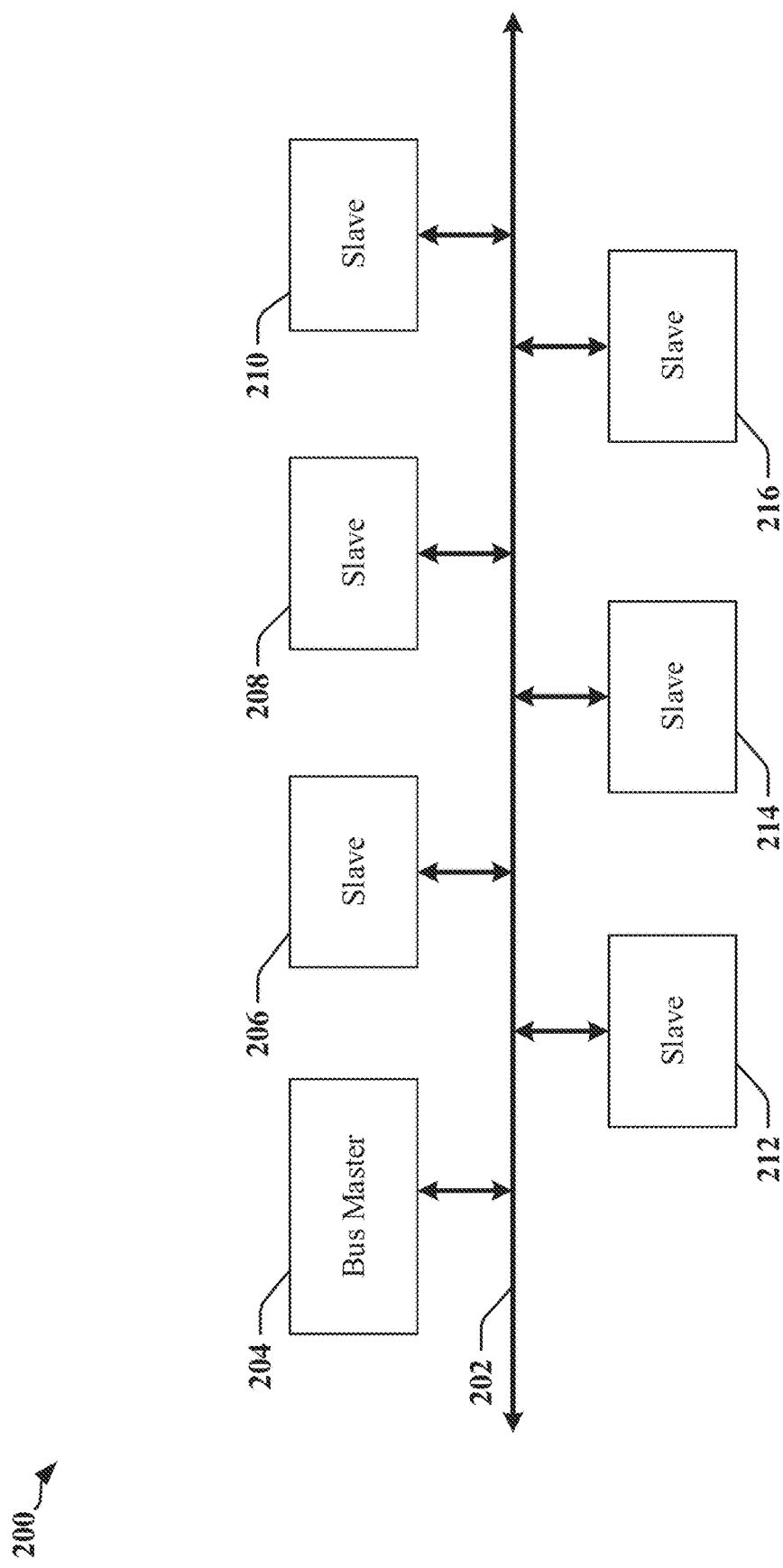
FIG. 2 illustrates a communication interface in which a plurality of devices is connected using a serial bus.

FIG. 2 illustrates a communication link 200 in which a configuration of devices 204, 206, 208, 210, 212, 214 and 216 are connected using a serial bus 202. In one example, the devices 204, 206, 208, 210, 212, 214 and 216 may be adapted or configured to communicate over the serial bus 202 in accordance with an I3C protocol. In some instances, one or more of the devices 204, 206, 208, 210, 212, 214 and 216 may alternatively or additionally communicate using other protocols, including an I2C protocol, for example.

Communication over the serial bus 202 may be controlled by a master device 204. In one mode of operation, the master device 204 may be configured to provide a clock signal that controls timing of a data signal. In another mode of operation, two or more of the devices 204, 206, 208, 210, 212, 214 and 216 may be configured to exchange data encoded in symbols, where timing information is embedded in the transmission of the symbols.

Figure 3:
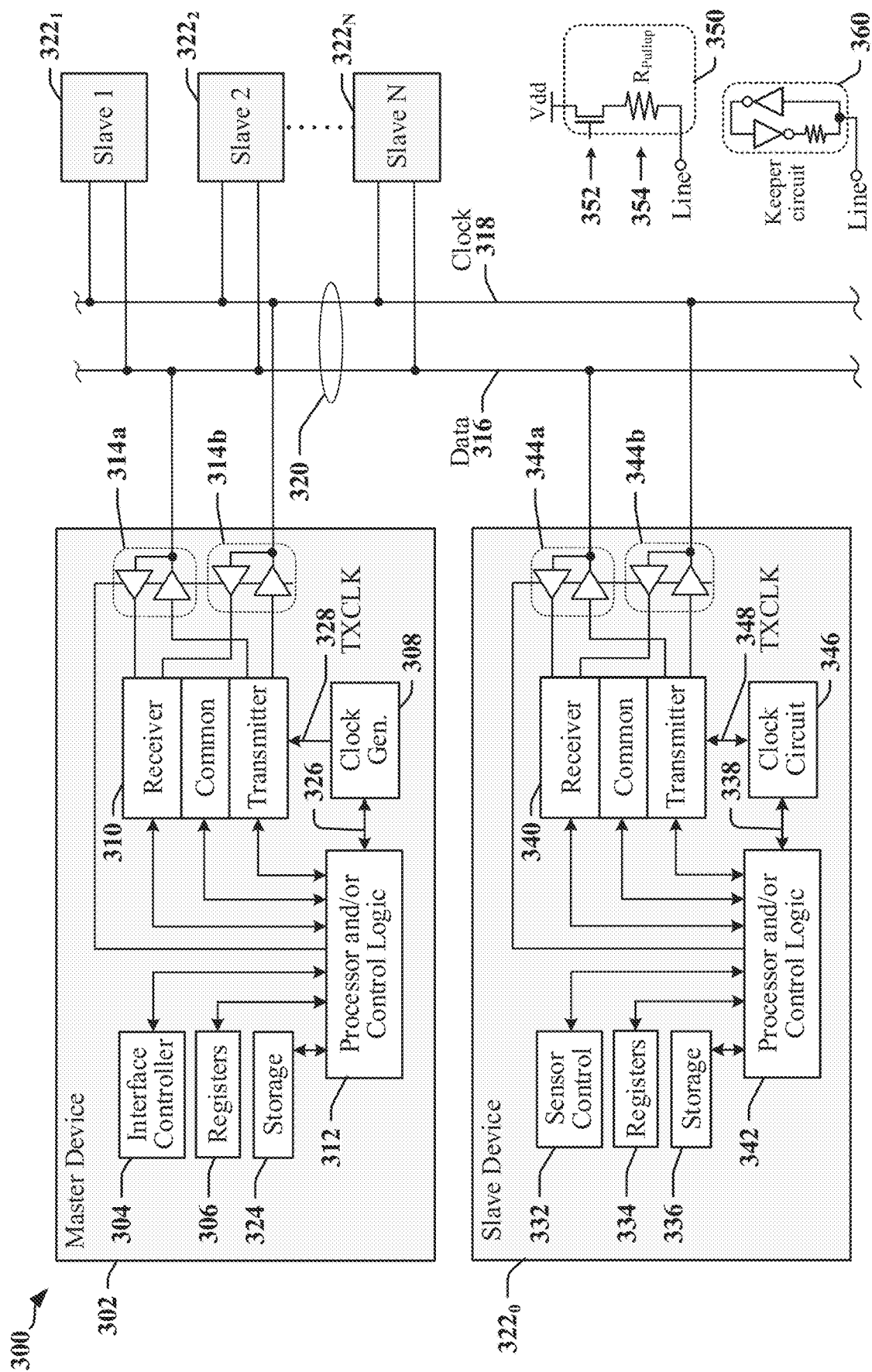
FIG. 3 illustrates a system architecture for an apparatus employing a data link between IC devices.

FIG. 3 illustrates certain aspects of an apparatus 300 that includes multiple devices 302, and $322_0$-$322_N$ coupled to a serial bus 320. The devices 302 and $322_0$-$322_N$ may be implemented in one or more semiconductor IC devices, such as an applications processor, SoC or ASIC. In various implementations, the devices 302 and $322_0$-$322_N$ may include, support or operate as a modem, a signal processing device, a display driver, a camera, a user interface, a sensor, a sensor controller, a media player, a transceiver, and/or other such components or devices. In some examples, one or more of the slave devices $322_0$-$322_N$ may be used to control, manage or monitor a sensor device. Communications between devices 302 and $322_0$-$322_N$ over the serial bus 320 is controlled by a bus master device 302. Certain types of bus can support multiple bus master devices 302.

In one example, a bus master device 302 may include an interface controller 304 that may manage access to the serial bus, configure dynamic addresses for slave devices $322_0$-$322_N$ and/or generate a clock signal 328 to be transmitted on a clock line 318 of the serial bus 320. The bus master device 302 may include configuration registers 306 or other storage 324, and other control logic 312 configured to handle protocols and/or higher-level functions. The control logic 312 may include a processing circuit such as a state machine, sequencer, signal processor or general-purpose processor. The bus master device 302 includes a transceiver 310 and line drivers/receivers 314a and 314b. The transceiver 310 may include receiver, transmitter and common circuits, where the common circuits may include timing, logic and storage circuits and/or devices. In one example, the transmitter encodes and transmits data based on timing in the clock signal 328 provided by a clock generation circuit 308. Other timing clock signals 326 may be used by the control logic 312 and other functions, circuits or modules.

At least one device $322_0$-$322_N$ may be configured to operate as a slave device on the serial bus 320 and may include circuits and modules that support a display, an image sensor, and/or circuits and modules that control and communicate with one or more sensors that measure environmental conditions. In one example, a slave device $322_0$ configured to operate as a slave device may provide a control function, module or circuit 332 that includes circuits or modules operable to support a display, an image sensor, and/or circuits and modules that control and communicate with one or more sensors that measure environmental conditions. The slave device $322_0$ may include configuration registers 334 or other storage 336, control logic 342, a transceiver 340 and line drivers/receivers 344a and 344b. The control logic 342 may include a processing circuit such as a state machine, sequencer, signal processor or general-purpose processor. The transceiver 310 may include receiver, transmitter and common circuits, where the common circuits may include timing, logic and storage circuits and/or devices. In one example, the transmitter encodes and transmits data based on timing in a clock signal 348 provided by clock generation and/or recovery circuits 346. The clock signal 348 may be derived from a signal received from the clock line 318. Other timing clock signals 338 may be used by the control logic 342 and other functions, circuits or modules.

The serial bus 320 may be operated in accordance with RFFE, I2C, I3C, SPMI, or other protocols. At least one device 302, $322_0$-$322_N$ may be configured to operate as a master device and a slave device on the serial bus 320. Two or more devices 302, $322_0$-$322_N$ may be configured to operate as a master device on the serial bus 320.

In some implementations, the serial bus 320 may be operated in accordance with an I3C protocol. Devices that communicate using the I3C protocol can coexist on the same serial bus 320 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may be provide higher data transfer rates. I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 320, in addition to data formats and aspects of bus control. In some aspects, the I2C and I3C protocols may define direct current (DC) characteristics affecting certain signal levels associated with the serial bus 320, and/or alternating current (AC) characteristics affecting certain timing aspects of signals transmitted on the serial bus 320. In some examples, a 2-wire serial bus 320 transmits data on a data line 316 and a clock signal on the clock line 318. In some instances, data may be encoded in the signaling state, or transitions in signaling state of the data line 316 and the clock line 318.

Pull-up circuits or structures may be coupled to the data line 316 and/or the clock line 318 to maintain the signaling state of the serial bus 320 when no device is actively driving the data line 316 and/or the clock line 318, including during line turnaround when a first device ceases driving the data line 316 and/or the clock line 318 and before a second device begins actively driving the data line 316 and/or the clock line 318. The pull-up circuits or structures may be implemented using a variety of circuits. In one example, a pull-up circuit 350 includes a pull-up resistor 354 that may be coupled to a source of higher voltage ($V_{dd}$) through a switch 352. In some instances, the switch 352 may be implemented as a suitably configured transistor. In some instances, the pull-up resistor 354 may be coupled directly to $V_{dd}$ and the switch 352 couples the pull-up structure to the data line 316 or the clock line 318. In another example, the pull-up circuits or structures may be implemented using a keeper circuit 360. The keeper circuit 360 may be configured as a positive feedback circuit that drives the data line 316 and/or the clock line 318 through a high impedance output, and receives feedback from the data line 316 and/or the clock line 318 through a low impedance input. The keeper circuit 360 may be configured to maintain the last asserted signaling state on the data line 316 and/or the clock line 318. The output of the keeper circuit 360 can be easily overcome by line drivers in the master device 302 or a slave device $322_0$-$322_N$.

High-Speed Data Transfers Over an I3C Serial Bus

Figure 4:
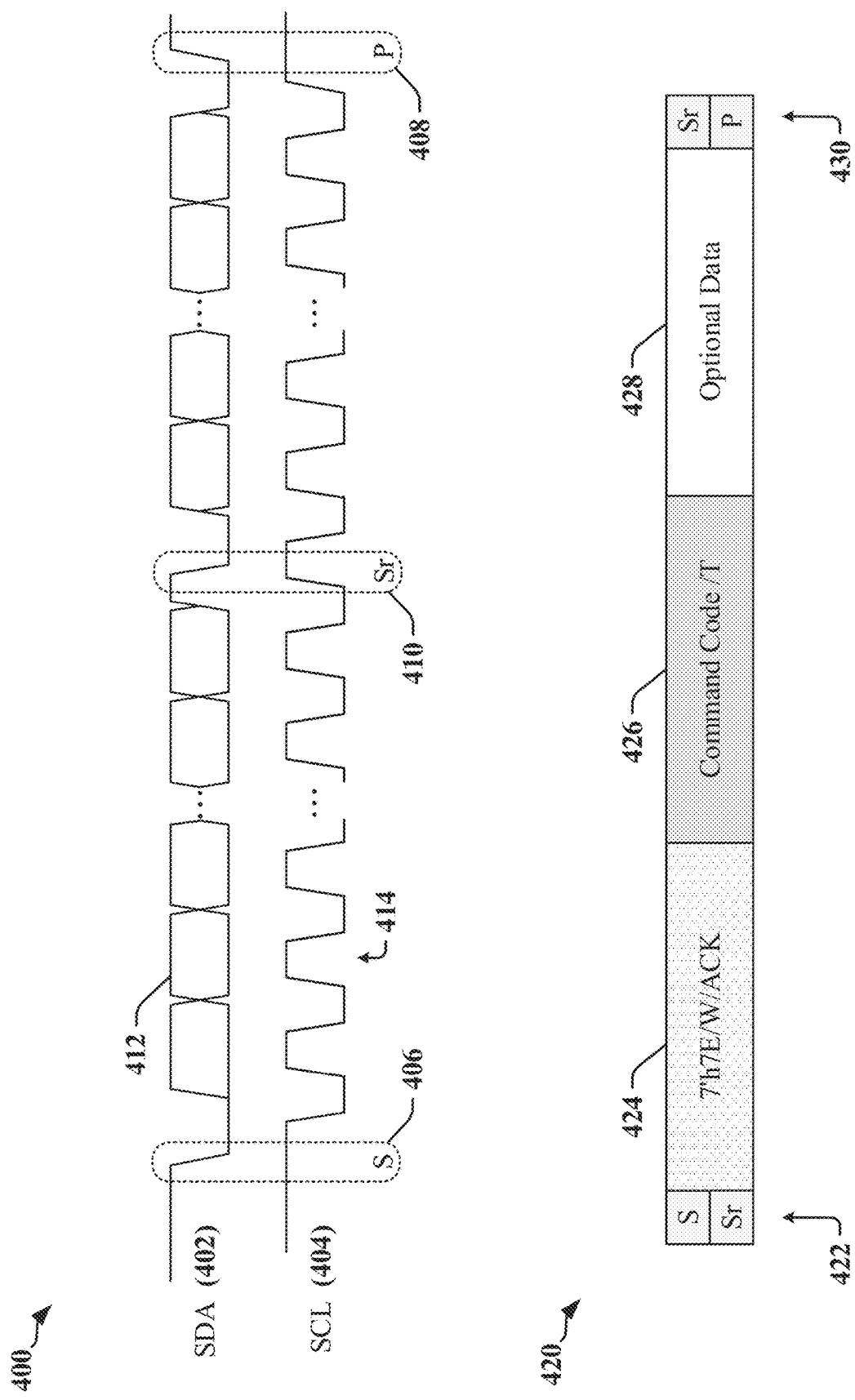
FIG. 4 includes a timing diagram that illustrates signaling on a serial bus when the serial bus is operated in a single data rate (SDR) mode of operation defined by I3C specifications.

FIG. 4 includes a timing diagram 400 that illustrates signaling on a serial bus when the serial bus is operated in a single data rate (SDR) mode of operation defined by I3C specifications. Data transmitted on a first wire (the Data wire 402) of the serial bus may be captured using a clock signal transmitted on a second wire (the Clock wire 404) of the serial bus. During data transmission, the signaling state 412 of the Data wire 4 is expected to remain constant for the duration of the pulses 414 when the Clock wire 404 is at a high voltage level. Transitions on the Data wire 402 when the Clock wire 404 is at the high voltage level indicate a START condition 406, a STOP condition 408 or a repeated START 410.

On an I3C serial bus, a START condition 406 is defined to permit the current bus master to signal that data is to be transmitted. The START condition 406 occurs when the Data wire 402 transitions from high to low while the Clock wire 404 is high. The bus master may signal completion and/or termination of a transmission using a STOP condition 408. The STOP condition 408 is indicated when the Data wire 402 transitions from low to high while the Clock wire 404 is high. A repeated START 410 may be transmitted by a bus master that wishes to initiate a second transmission upon completion of a first transmission. The repeated START 410 is transmitted instead of, and has the significance of a STOP condition 408 followed immediately by a START condition 406. The repeated START 410 occurs when the Data wire 402 transitions from high to low while the Clock wire 404 is high.

The bus master may transmit an initiator 422 that may be a START condition 406 or a repeated START 410 prior to transmitting an address of a slave, a command, and/or data. FIG. 4 illustrates a command code transmission 420 by the bus master. The initiator 422 may be followed in transmission by a predefined command 424 indicating that a command code 426 is to follow. The command code 426 may, for example, cause the serial bus to transition to a desired mode of operation. In some instances, data 428 may be transmitted. The command code transmission 420 may be followed by a terminator 430 that may be a STOP condition 408 or a repeated START 410.

Figure 5:
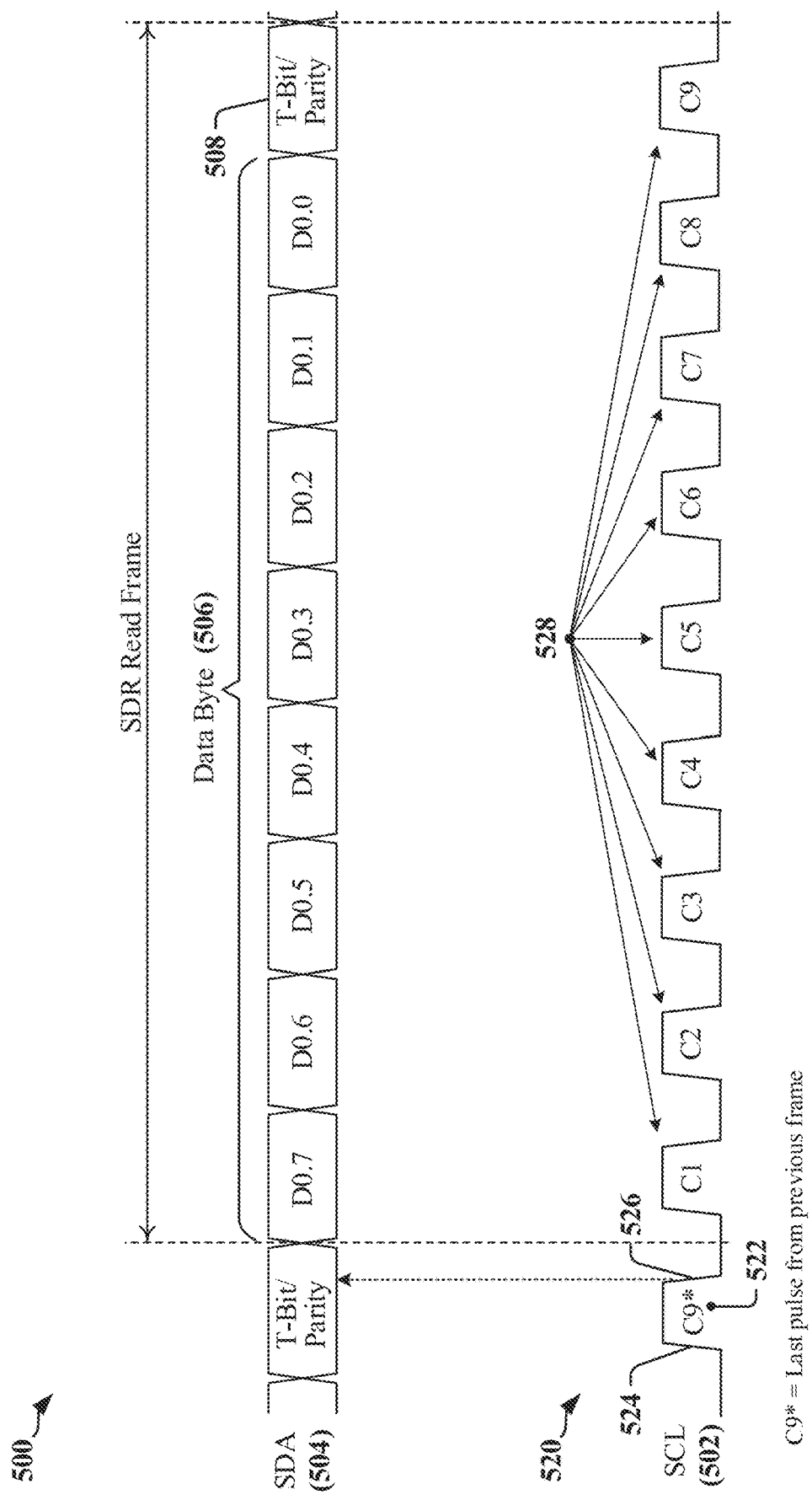
FIG. 5 is a timing diagram that illustrates an example of a transmission of a frame in an I3C single data rate mode.
Figure 6:
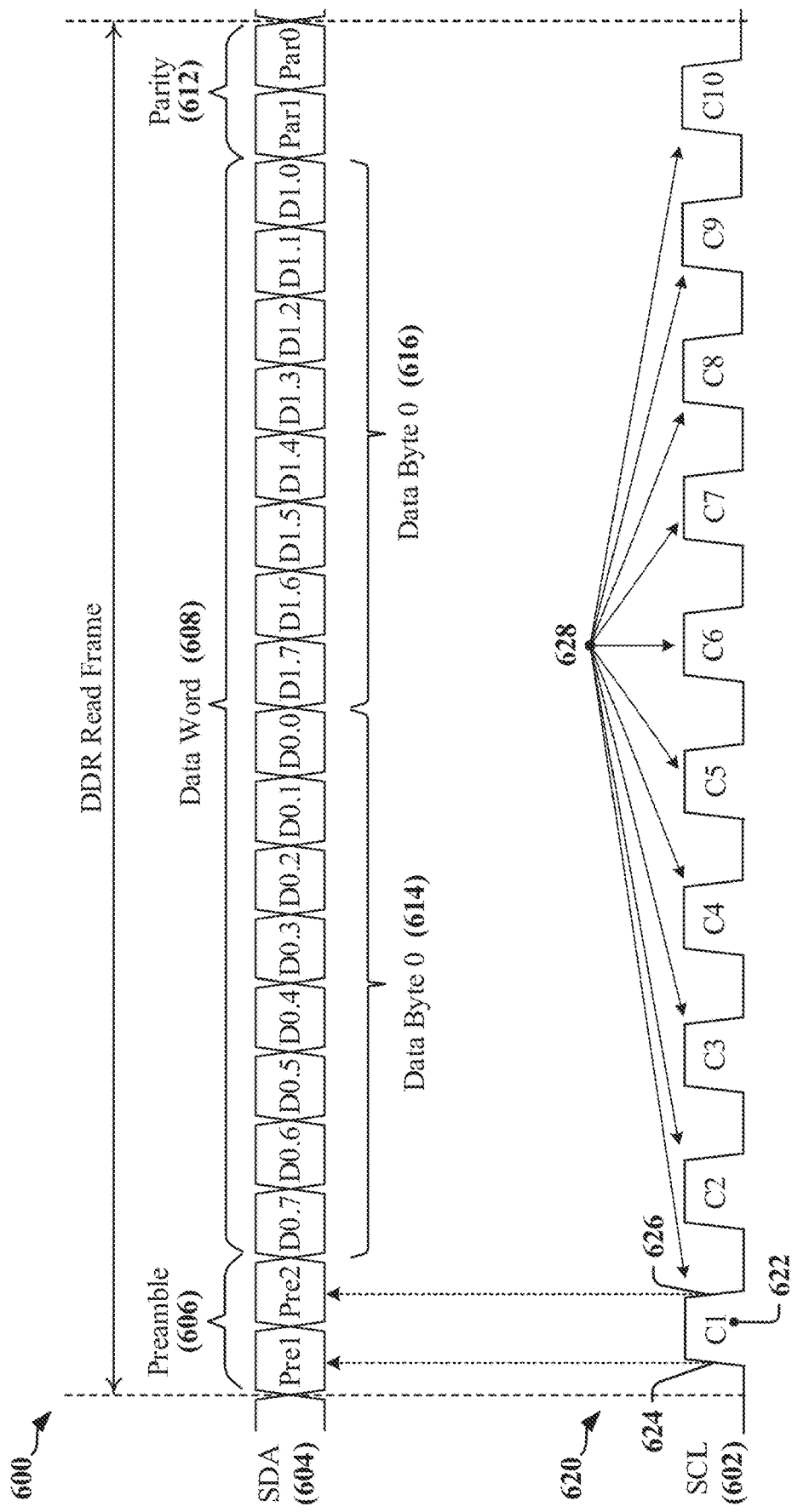
FIG. 6 is a timing diagram that illustrates an example of a transmission of a frame in an I3C high data rate mode, where data is transmitted at double data rate (DDR).

FIGS. 5 and 6 include timing diagrams that illustrate frames 500, 600 transmitted on a serial bus when a bus master device is reading from a slave device. The serial bus has a clock wire (SCL 502, 602) and a Data wire (SDA 504, 604). A clock signal 520, 620 transmitted on SCL 502, 602 provides timing may be usable when the serial bus is operated in an I3C single data rate (SDR) mode and in an I3C high data rate (HDR) double data rate (DDR) mode. The clock signal includes pulses 522, 528, 622, 628 that are defined by a rising edge 524, 624 and a falling edge 526, 626. A bus master device transmits the clock signal on the SCL 502, 602 regardless of the direction of flow of data over the serial bus.

FIG. 5 illustrates a frame 500 transmitted while the serial bus is operated in the I3C SDR mode. A single byte of data 506 is transmitted in each frame 500. The data signal transmitted on SDA 504 is expected to be stable for the duration of the high state of the pulses 528 in the clock signal 520 and, in one example, the state of SDA 504 is sampled on the falling edges of the clock pulses 528. Each byte of data 506 is followed by a bit 508 that can serve as a parity bit or a transition bit (T-Bit).

FIG. 6 illustrates a frame 600 transmitted while the serial bus is operated in the I3C HDR-DDR mode. In the I3C HDR-DDR mode, data is transferred at both the rising edge 624 and the falling edge 626 of a pulse 622 in the clock signal 620. A receiver samples or captures one bit of data on SDA 604 at each edge of the pulses 628 in the clock signal 620. A 2-byte data word 608 is transmitted in each frame 600 in the I3C HDR-DDR mode. A data word 608 generally includes 16 payload bits, organized as two 8-bit bytes 614, 61 and the data word 608 is preceded by a two-bit preamble 606 and followed by two parity bits 612. The 20 bits in the frame 600 can be transferred on the edges of 10 clock pulses. The integrity of the transmission may be protected by the transmission of the parity bits 612.

Figure 7:
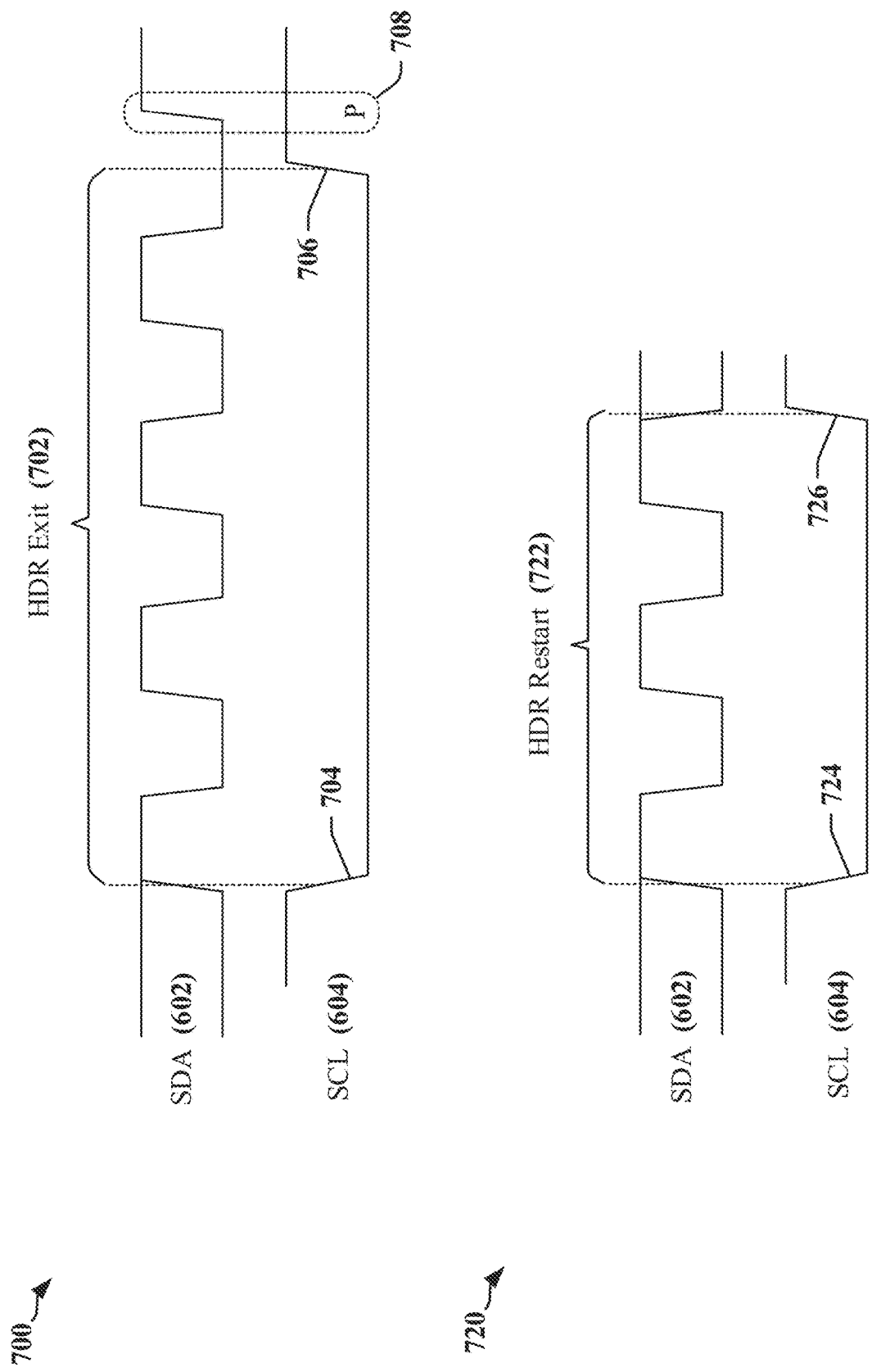
FIG. 7 illustrates an example of signaling transmitted on the Data wire and Clock wire of a serial bus to initiate certain mode changes.

An I3C bus may be switched between I3C SDR and I3C DDR modes. FIG. 7 illustrates examples of signaling 700, 720 transmitted on SDA 604 and SCL 602 to initiate certain mode changes. The signaling 700, 720 is defined by I3C protocols for use in initiating restart, exit and/or break from I3C HDR modes of communication.

The first signaling 700 serves an HDR Exit 702 that may be used to cause an HDR break or exit. The HDR Exit 702 commences with a falling edge 704 on SCL 602 and ends with a rising edge 706 on SCL 602. While SCL 602 is in low signaling state, four pulses are transmitted on SDA 604. I2C devices ignore SDA 604 when no pulses are provided on SCL 602. A stop condition 708 may be transmitted to cause slave devices to reset their respective bus interfaces.

The second signaling 720 is an HDR Restart 722 that may be used to indicate a continuation of HDR transmission. The HDR Restart 722 commences with a falling edge 704 on SCL 602 and ends with a rising edge 706 on SCL 602, which confirms further HDR transmission. While SCL 602 is in low signaling state, three pulses are transmitted on SDA 604. I2C devices ignore SDA 604 when no pulses are provided on SCL 602.

Multilane Serial Bus

Various examples discussed herein may be based on, or refer to a MIPI-defined I3C bus, operated in an SDR mode. The use of MIPI I3C SDR mode and other I3C mode is referenced as one example, and the principles disclosed herein are applicable in other examples and contexts.

In some aspects, enhanced capability and speed increases may be obtained by the addition of one or more supplementary lines, enabling a change in the coding base to higher numbers. For example, in addition to a two-wire bus, many I2C legacy systems use one or more dedicated interrupt lines between a master device and one or more slave devices. These dedicated interrupt lines may be repurposed for multi-lane operation in which data can be transmitted on two or more wires in accordance with timing provided by a clock signal transmitted on a clock wire. A two-line serial bus operated in an I3C SDR mode can be extended with one or more additional lines.

Figure 8:
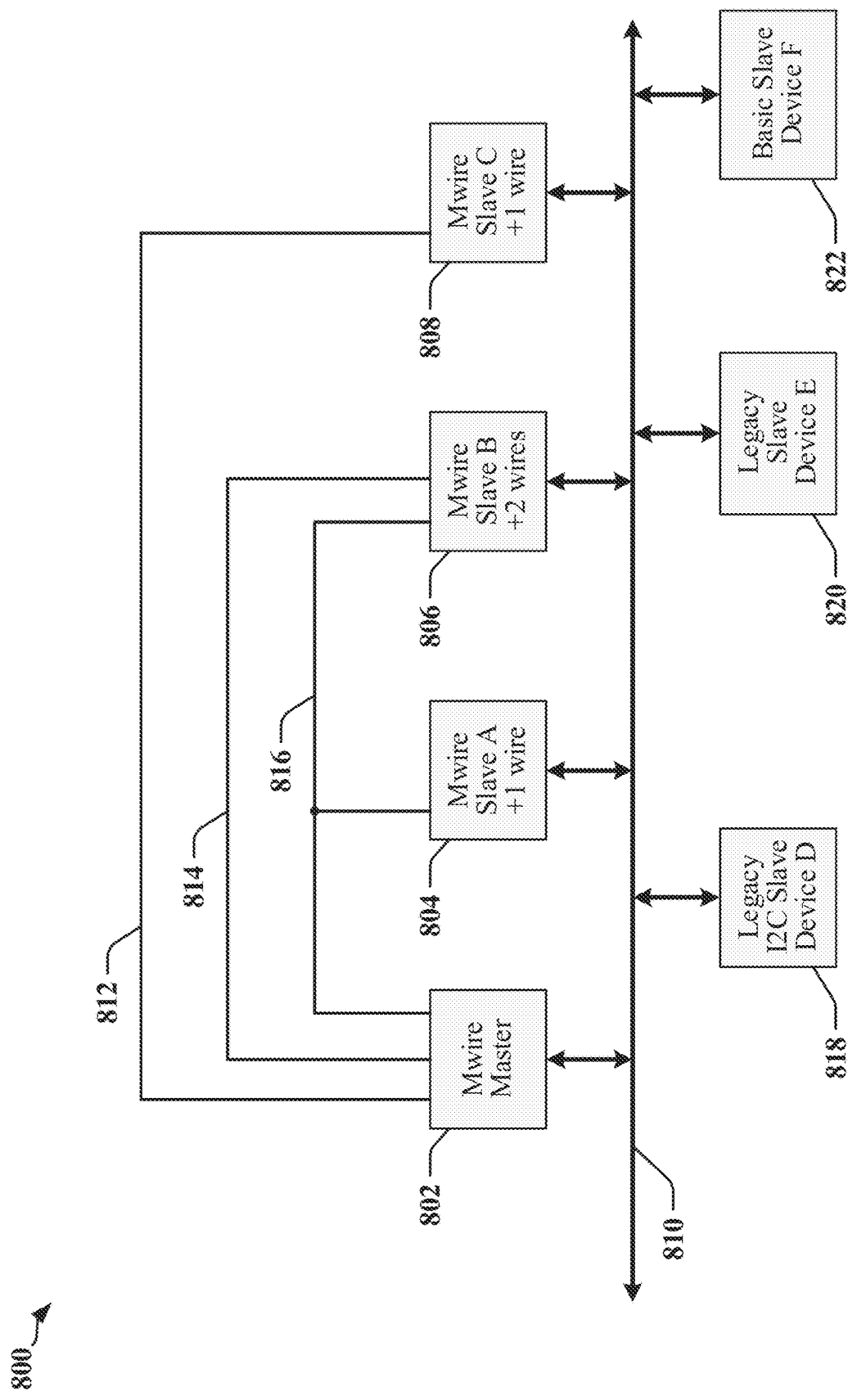
FIG. 8 illustrates a serial bus in which more than two connectors or wires may be available for timeshared communication between devices.

FIG. 8 illustrates a serial bus 800 in which more than two connectors or wires may be available for communication between devices 802, 804, 806, and/or 808. Devices 802, 804, 806, and/or 808 that can support communication over an expanded serial bus that includes additional wires may be referred to as multi-lane (Multilane) devices or multilane devices. Note that the terms "connector", "wire" and "line" may be interchangeably used herein to refer to an electrically conductive path. In some instances, a "connector", "wire", and "line" may apply to an optically conductive path. In addition to the common lines 316, 318 of a 2-wire serial bus, additional connectors or wires 812, 814, and/or 816 may be employed to couple a Multilane master device 802 to one or more Multilane slave devices 804, 806, and/or 808 separately from the serial bus 810. In one example, one Multilane slave device 808 may be connected to the Multilane master device 802 using a single, dedicated additional connector or wire 812. In another example, one Multilane slave device 804 may be connected to the Multilane master device 802 using a single, shared additional connector or wire 816. In another example, one Multilane slave device 806 may be connected to the Multilane master device 802 using two or more dedicated and/or shared additional connectors or wires 814 and 816. The number, type and arrangement of additional connectors or wires 812, 814, and/or 816 can be selected to balance bandwidth and power consumption for communications between Multilane devices 802, 804, 806, and/or 808. In some instances, the additional connectors may include optical or other types of connectors.

According to certain aspects, any number of wires that is greater than two physical lines can be used in an I3C interface. A shared bus 810 may be a two-wire serial bus that includes the Clock line 316 and Data line 318 wires of FIG. 3, or SCL 502, 602 and SDA 504, 604 in FIGS. 5 and 6. The shared bus 810 may be used for communicating with legacy devices 818, 820 and/or I3C devices 822 that are not configured for multilane operation. Legacy devices 818, 820 may include I2C device 818, an I3C device 822, or another type of device that uses a two-wire protocol compatible with other devices 802, 804, 806, 808, 818, 820, 822 coupled to the shared bus 810.

Bus management messages may be included in shared bus management protocols implemented on the Multilane-capable bus client devices 802, 804, 806, and 808. Bus management messages may be transferred between Multilane-capable devices 802, 804, 806, and 808 using the shared bus 810. Bus management messages may include address arbitration commands and/or messages, commands and/or messages related to data transport mode entry and exit, commands and/or messages used in the exchange of configuration data including, for example, messages identifying supported protocols, number and allocation of available physical wires, and commands and/or messages that are to negotiate or select a mode of communications.

As illustrated in FIG. 8, different legacy client devices 818 and 820 and I3C devices 822 that have more basic signaling capabilities may be supported by the I3C interface. The devices 802, 804, 806, 808, 818, 820, 822 coupled to the shared bus 810 are compatible with at least one common mode of communication (e.g., predefined base protocol over the two-wire bus 810). In one example the predefined base protocol (e.g., lowest common denominator protocol), may support an I2C mode of communication. In this latter example, each of the devices 802, 804, 806, 808, 818, 820, 822 may be adapted to at least recognize start and stop conditions defined by the predefined base protocol.

Two or more devices 802, 804, 806, 808, 820, and/or 822 may communicate using a second protocol (e.g., I3C SDR, I3C HDR-DDR, I3C HDR-Ternary, etc.) that is not supported by some of the other devices coupled to the shared bus 810. The two or more devices 802, 804, 806, 808, 818, 820, 822 may identify capabilities of the other devices using the predefined base protocol (e.g., an I2C protocol), after an I3C exchange is initiated, and/or through signaling on one or more additional connectors or wires 812, 814 and/or 816. In at least some instances, the configuration of devices coupled to the shared bus 810 may be predefined in the devices 802, 804, 806, 808, 818, 820, 822.

The additional connectors or wires 812, 814 and/or 816 may include multipurpose, reconfigurable connectors, wires, or lines that connect two or more of the Multilane devices 802, 804, 806, 808. The additional connectors or wires 812, 814 and/or 816 may include repurposed connections that may otherwise provide inter-processor communications capabilities including, for example interrupts, messaging and/or communications related to events. In some instances, the additional connectors or wires 812, 814 and/or 816 may be provided by design. In one example, the predefined base protocol may utilize the additional connectors or wires 812, 814 and/or 816 for sending interrupts from the slave devices to the master device. In the second protocol, the additional connectors or wires 812, 814 and/or 816 may be repurposed to transmit data in combination with the two-wire bus. The term "data lane" may be used herein to refer to a data line or wire used to communicate data when a device can support multiple data lines or wires (multiple data lanes).

Master and Slave roles are typically interchangeable between devices 802, 804, 806, 808, and FIG. 8 relates to a single interaction between two or more of the devices 802, 804, 806, 808, and/or 822. As illustrated, the current master device 802 can support extended communication capabilities with the other devices 804, 806, 808, using a combination of the additional connectors or wires 812, 814, and 816. The master device 802 is connected to two slave devices 804 and 808 using a single additional connector or wire 816 and 812, respectively. The master device 802 is connected to one slave device 806 using a pair of additional wires 814 and 816. Accordingly, the master device 802 may be configured to select a number of wires for communication based on the capabilities of all slave devices 804, 806, and/or 808 that are involved in a transaction. For example, the master device 802 may send data to the first slave device B 806 using the two-wire bus 810 plus both repurposed wires 814 and 816. Additionally, the master device 802 may send data to the second slave device A 804 using the two-wire bus 810 plus a first repurposed wire 816.

Data transmitted between two or more Multilane-capable devices 802, 804, 806, and/or 808 may be encoded using an adapted encoding scheme. One aspect provides for using the two-wire bus 810 and one or additional connectors or wires 812, 814, and/or 816 may be used to transmit data using all data wires for I3C SDR and I3C HDR-DDR modes.

According to certain aspects disclosed herein, a multilane extension of an I3C bus may be implemented to provide increased data throughput, while keeping the I3C Interface bus management procedures. In one example, I3C frame settings may be preserved to maintain the position of control information in frames that carry data during read and write operations. The content and operation of the control information may be defined by standards-defined protocols specified by standards bodies, industry associations and the like. The content and operation of the control information may be defined by proprietary protocols that, in some instances, may coexist or be compatible with standards-defined protocols. In some implementations, control information may include break points, preambles, T-bits, parity bits, and/or ACK/NACK signaling that can be transmitted within frame structures used by conventional two-wire buses operated in accordance with the standards-defined protocols or proprietary protocols.

In the examples illustrated by FIGS. 8-11, control information may be transmitted over a multi-wire bus in control bit fields defined by a protocol governing operation of the serial bus during a transaction. The control bit fields are defined for each frame transmitted during the transaction. In one example, the protocol governing operation of the serial bus during a transaction is defined by I3C specifications, where information is transmitted over the primary data lane is consistent with control bit field usage defined by I3C specifications for a two-wire bus. In accordance with certain aspects disclosed herein, certain bits in one or more control bit fields may be repurposed and/or new meaning may be defined for previously unused bits in one or more control bit fields. The bit fields may be configured such that a conventional one-lane slave device (coupled to two wires of the multi-lane serial bus) detects no difference in frame structure. In other examples, control information is transmitted over a multi-lane bus in control bit fields defined by proprietary specifications or protocols. In these examples, certain bits in the control bit fields may be repurposed and/or new meaning may be defined for previously unused bits in accordance with certain aspects disclosed herein.

The disclosure may employ certain examples involving a serial bus operated based on I3C specifications or protocols, although the concepts described can be applied to equally to a serial bus operated based on proprietary I3C specifications or protocols and/or specifications or protocols derived from conventional I3C specifications or protocols. The examples include implementations where control information is transmitted on a multi-wire serial bus that supports a multilane version of I3C protocols, and which may permit devices with single, dual or quad data lane communication capability to be connected using at least the same two-wire base lanes. Multilane-capable devices can be enabled a priori, with available data lanes enabled or supported.

Figure 9:
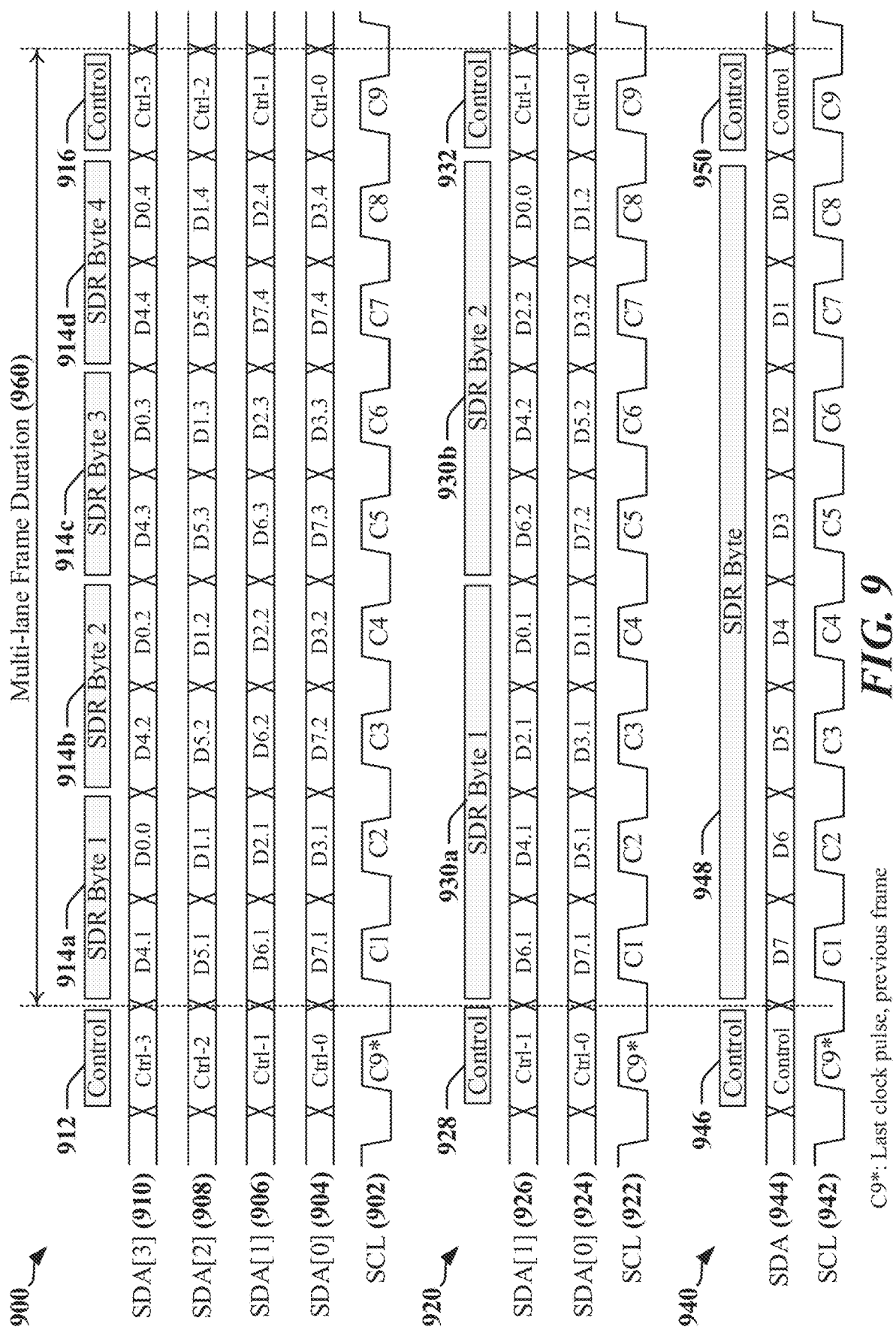
FIG. 9 illustrates first examples of the transmission of data over a serial bus operated when two or more devices coupled through a serial bus can communicate over one or more connectors, lines or wires.

Certain aspects of data frames that can be transmitted over a multilane serial bus are illustrated in FIG. 9. FIG. 9 provides examples 900, 920, 940 of transmissions of data over a serial bus operated in an SDR mode when two or more devices coupled through a serial bus can communicate over one or more connectors, lines or wires. The examples 900, 920, 940 relate to frames exchanged between slave and bus master devices when the serial bus is operated in accordance with I3C protocols. In each example, 900, 920, 940 a common frame duration 960 is maintained regardless of the number of additional wires used. For example, a transaction that involves the use of 2 data wires and one clock wire can communicate twice as many bits as a transaction that uses 1 data wire and one clock signal. The additional bits may include payload data bits, control or other protocol-defined bits and/or other information. In accordance with certain aspects of this disclosure, one or more of the control bits 916, 932, 950 may be repurposed to enhance bus efficiency, coordinate or synchronize devices coupled to the serial bus, including signaling changes in modes of operation for example One or more of the control bits 916, 932, 950 that have no protocol-defined purpose may be used to enhance bus efficiency, coordinate or synchronize devices coupled to the serial bus. In SDR mode, a data or control bit can be transmitted on each data wire concurrently with a single clock pulse transmitted on the clock wire. The maintenance of a common transaction and/or frame duration 960 can provide a constant separation between control bits 916, 932, 950, and the content of certain control bits 916, 932, 950 may be configured to enable conventional or less-capable devices coupled to the bus and configured for a conventional two-wire mode of operation to remain unaware of the use of additional wires.

The common transaction and/or frame duration 960 may effectively define a cadence for bus operations.

In a first example 940, no additional wires are used and communication proceeds using two wires (SCL 942 and SDA 944). A serialized data byte 948 may be transmitted with a control bit 916. In the illustrated example, the serialized data byte 948 is transmitted after a control bit 946 from the previous frame. In a second example 920, one additional wire is used and communication proceeds using three wires (SCL 922, SDA[0] 924 and SDA [1] 926). Two data bytes 930a, 930b may be transmitted with a pair of control bits 932. In the illustrated example, the data bytes 930a, 930b are transmitted after the control bits 928 from the previous frame. The data bytes 930a, 930b can be transmitted in a striped mode, whereby a first data byte 930a is completely transmitted in two-bit nibbles on the two data wires before the second data byte 930b is transmitted. In a third example 900, three additional wires are used and communication proceeds using five wires (SCL 902, SDA [0] 904, SDA[1] 906, SDA[2] 908 and SDA[3] 910). Four data bytes 914a, 914b, 914c and 914d may be transmitted with four control bits 916. In the illustrated example, the data bytes 914a, 914b, 914c and 914d are transmitted after a control bit 946 from the previous frame. The data bytes 914a, 914b, 914c, 914d can be transmitted in a striped mode, whereby a first data byte 914a is completely transmitted in four-bit nibbles on the four data wires before the second data byte 914b is transmitted.

In each of the examples 900, 920, 940 in FIG. 9, data is clocked on one edge of each clock pulse in the clock signal, consistent with I3C SDR protocols for example. In each of the examples 900, 920, 940 in FIG. 9, the current frame is terminated after a respective breaking point 916, 932, 950.

Figure 10:
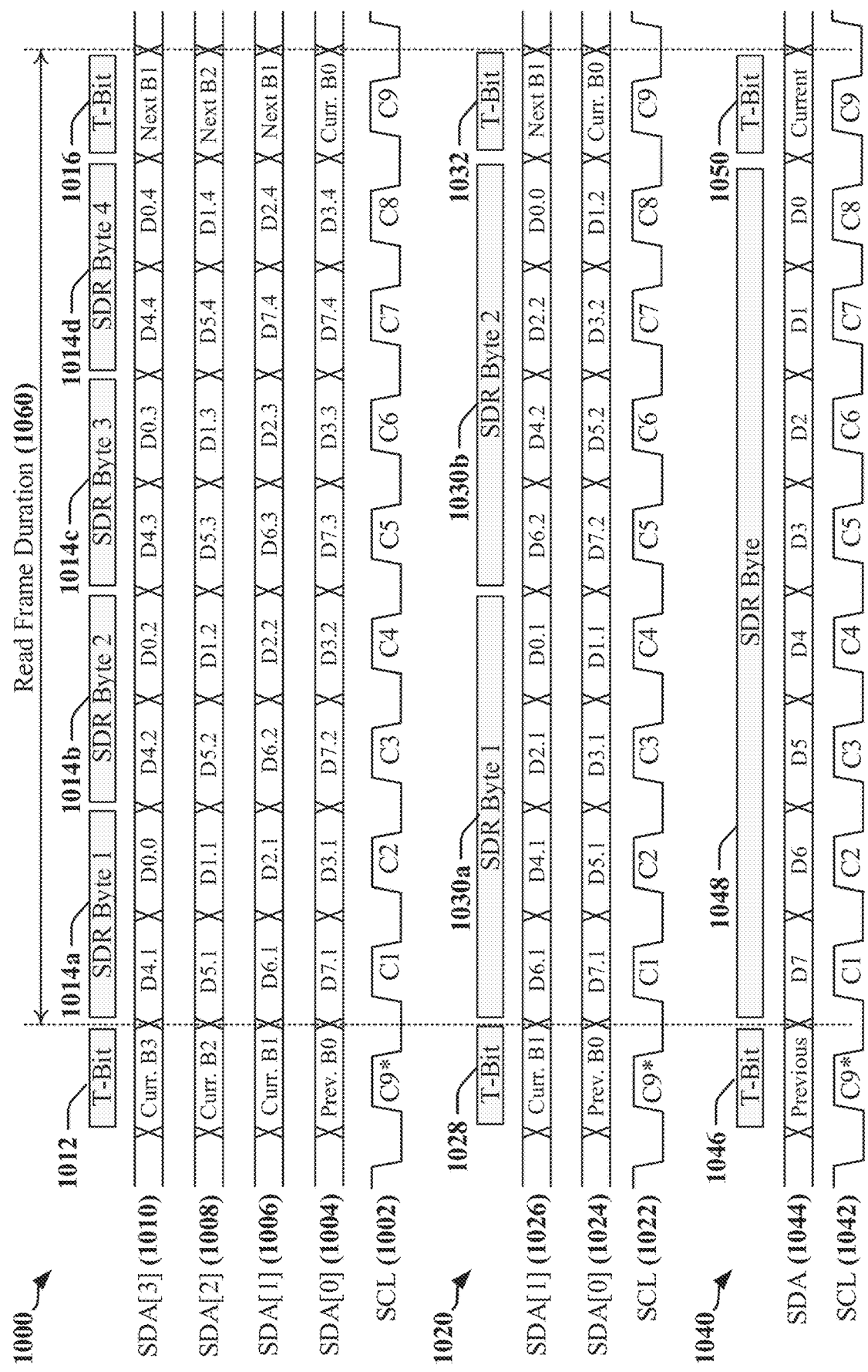
FIG. 10 illustrates second examples of the transmission of data over a serial bus when two or more devices can be coupled to additional connectors, lines or wires.

Certain aspects of read data frames that can be transmitted over a multilane serial bus are illustrated in FIG. 10. FIG. 10 provides examples 1000, 1020, 1040 of transmissions of data over a serial bus when two or more devices can be coupled to additional connectors, lines or wires. For example, a transaction that involves the use of 2 data wires and one clock wire can communicate twice as many bits as a transaction that uses 1 data wire and one clock signal. The bits transmitted on the additional wire may include payload data bits, parity bits, other protocol-defined bits and/or other information as defined by the protocol that controls transmissions over the serial bus. The examples 1000, 1020, 1040 relate to transmissions of read frames transmitted when a slave device is read by a bus master device in accordance with I3C protocols. In each example, 1000, 1020, 1040 a common transaction and/or frame duration 1060 is maintained regardless of the number of additional wires used. The maintenance of a common transaction and/or frame duration 1060 can provide a constant separation between break points 1012, 1016 (T-bits), and devices coupled to the bus and configured for a conventional two-wire mode of operation remain unaware of the use of additional wires. The common transaction and/or frame duration 1060 may effectively define a cadence for bus operations.

In a first example 1040, no additional wires are used and communication proceeds using two wires (SCL 1042 and SDA 1044). A serialized data byte 1048 may be transmitted after a T-bit at the breaking point 1046. In a second example 1020, one additional wire is used and communication proceeds using three wires (SCL 1022, SDA[0] 1024 and SDA[1] 1026). Two data bytes 1030a, 1030b may be transmitted after a T-bit at the breaking point 1028. In the example, the data bytes 1030a, 1030b are transmitted in a striped mode, whereby a first data byte 1030a is completely transmitted in two-bit nibbles on the two data wires before the second data byte 1030b is transmitted. In a third example 1000, three additional wires are used and communication proceeds using five wires (SCL 1002, SDA[0] 1004, SDA[1] 1006, SDA[2] 1008 and SDA[3] 1010). Four data bytes 1014a, 1014b, 1014c and 1014d may be transmitted after a T-bit at the breaking point 1012. In the example, the data bytes 1014a, 1014b, 1014c, 1014d are transmitted in a striped mode, whereby a first data byte 1014a is completely transmitted in four-bit nibbles on the four data wires before the second data byte 1014b is transmitted.

In each of the examples 1000, 1020, 1040 in FIG. 10, data is clocked on one edge of each clock pulse in the clock signal, in accordance with I3C SDR protocols. In each of the examples 1000, 1020, 1040 in FIG. 10, the current frame is terminated after a respective breaking point 1016, 1032, 1050. At each breaking point 1016, 1032, 1050, I3C specifications are satisfied when a T-Bit is transmitted on the primary data wire (SDA 1044, SDA[0] 1024 and SDA[1] 1004, respectively). T-Bits do not need to be transmitted on the additional wires.

Figure 11:
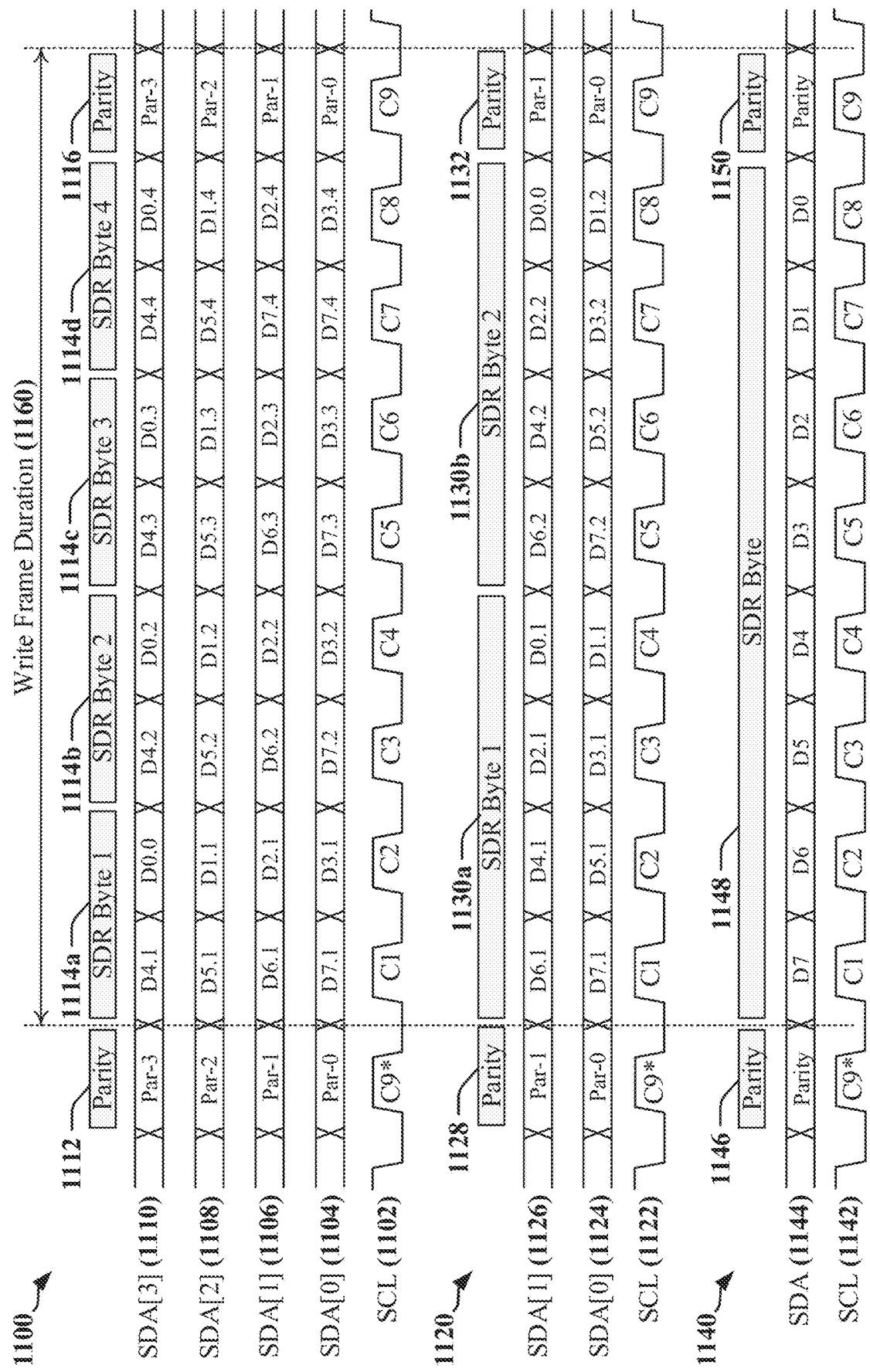
FIG. 11 illustrates third examples of the transmission of data over a serial bus when two or more devices can be coupled to additional connectors, lines or wires.

Certain aspects of write data frames that can be transmitted over a multilane serial bus are illustrated in FIG. 11. FIG. 11 provides examples 1100, 1120, 1140 of transmissions of data over a serial bus when two or more devices can be coupled to additional connectors, lines or wires. For example, a transaction that involves the use of 2 data wires and one clock wire can communicate twice as many bits as a transaction that uses 1 data wire and one clock signal. The bits transmitted on the additional wire may include payload data bits, parity bits, other protocol-defined bits and/or other information as defined by the protocol that controls transmissions over the serial bus. The examples 1100, 1120, 1140 relate to transmissions of read frames transmitted when a slave device is written by a bus master device in accordance with I3C protocols. In each example, 1100, 1120, 1140 a common transaction and/or frame duration 1160 is maintained regardless of the number of additional wires used. The maintenance of a common transaction and/or frame duration 1160 can enable devices coupled to the bus and configured for a conventional two-wire mode of operation remain unaware of the use of additional wires. The common transaction and/or frame duration 1160 may effectively define a cadence for bus operations.

In a first example 1140, no additional wires are used and communication proceeds using two wires (SCL 1142 and SDA 1144). A serialized data byte 1148 may be transmitted with parity. In the illustrated example, a parity bit 1150 may be transmitted after the serialized data byte 1148 and the serialized data byte 1148 may be preceded in transmission by the parity bit 1150 of the previous byte. In a second example 1120, one additional wire is used and communication proceeds using three wires (SCL 1122, SDA[0] 1124 and SDA[1] 1126). Two data bytes 1130a, 1130b may be transmitted with parity. In the illustrated example, parity bits 1132 may be transmitted after the data bytes 1130a, 1130b and the data bytes 1130a, 1130b may be preceded in transmission by the parity bits 1128 of the previous data bytes. In some implementations, the data bytes 1130a, 1130b are transmitted in a striped mode, whereby a first data byte 1130a is completely transmitted in two-bit nibbles on the two data wires before the second data byte 1130b is transmitted. In a third example 1100, three additional wires are used and communication proceeds using five wires (SCL 1102, SDA[0] 1104, SDA[1] 1106, SDA[2] 1108 and SDA [3] 1110). Four data bytes 1114a, 1114b, 1114c and 1114d may be transmitted with parity. In the illustrated example, parity bits 1116 may be transmitted after the data bytes 1114a, 1114b, 1114c and 1114d and the data bytes 1114a, 1114b, 1114c and 1114d may be preceded in transmission by the parity bits 1112 of the previous data bytes. In some implementations, the data bytes 1114a, 1114b, 1114c, 1114d are transmitted in a striped mode, whereby a first data byte 1114a is completely transmitted in four-bit nibbles on the four data wires before the second data byte 1114b is transmitted.

In each of the examples 1100, 1120, 1140 in FIG. 11, data is clocked on one edge of each clock pulse in the clock signal, in accordance with I3C SDR protocols. In each of the examples 1100, 1120, 1140 in FIG. 11, the current frame is terminated after a respective breaking point 1116, 1132, 1150. At each breaking point 1116, 1132, 1150, I3C specifications are satisfied when a T-Bit is transmitted on the primary data wire (SDA 1144, SDA[0] 1124 and SDA[1] 1104, respectively). T-Bits do not need to be transmitted on the additional wires.

According to certain aspects disclosed herein, a multilane extension of an I3C bus may be implemented to provide increased data throughput, while keeping the I3C Interface bus management procedures. In one example, I3C frame settings may be preserved to maintain the position of break points, preambles, T-bits, parity, and/or ACK/NACK within frame structures used by conventional two-wire buses operated in accordance with I3C specifications. The multilane version of an I3C interface permits devices of single, dual or quad data lanes capability to be connected on the same two-wire base lanes. Multilane-capable devices can be enabled a priori, with available data lanes enabled or supported.

Figure 12:
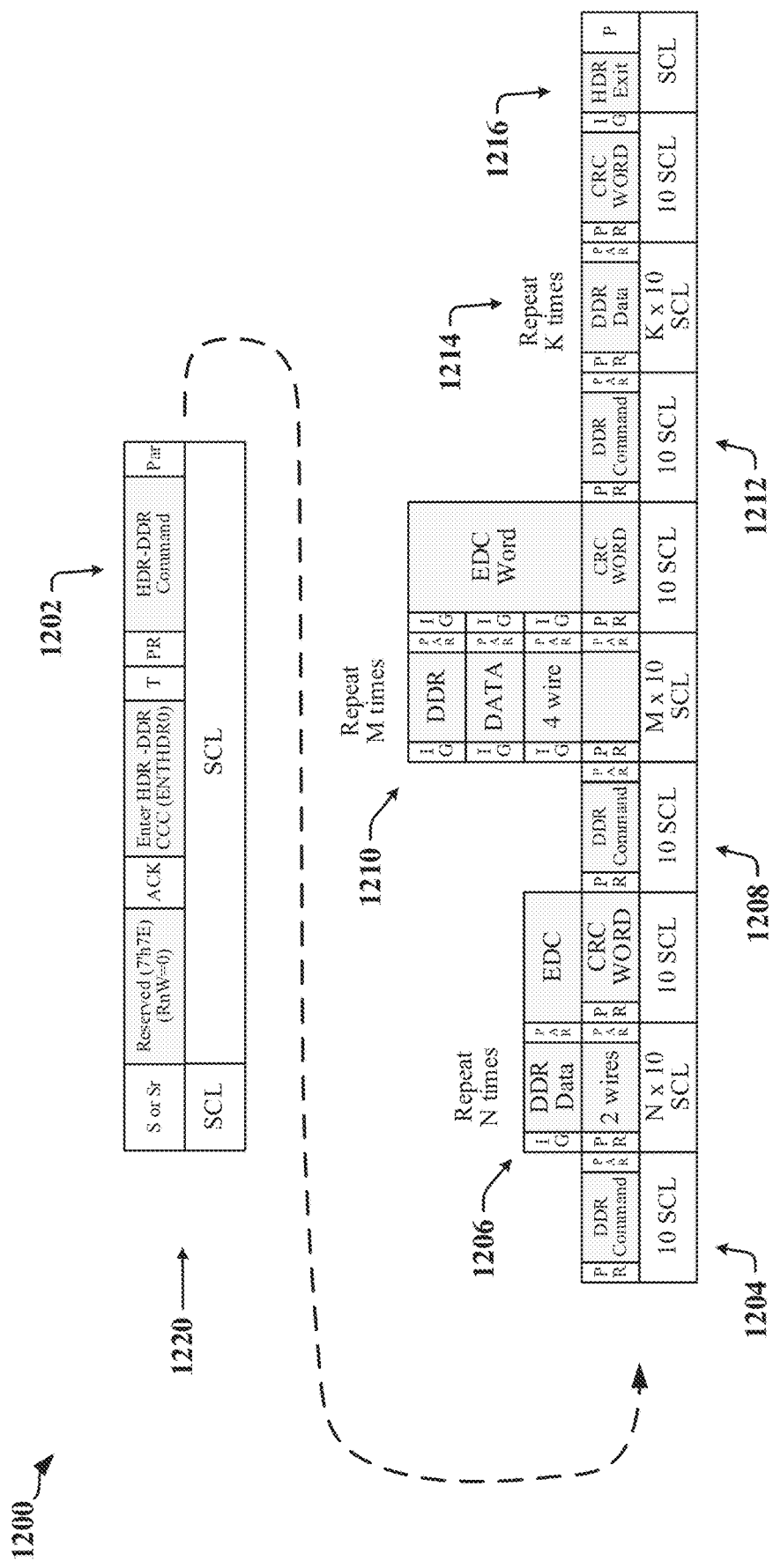
FIG. 12 is an example of a timeline illustrating the operation of a multi-lane enabled bus.

According to certain aspects, a multilane serial bus may be dynamically switched between modes of operation and may select a number of data lanes, or symbol bit-size for use in transmissions between multilane-enabled devices. FIG. 12 is an example of a timeline 1200 illustrating the operation of a multilane-enabled serial bus. The serial bus may initially be configured for a mode of operation supported by all devices coupled to the serial bus. In one example, all devices coupled to the serial bus may support an I3C SDR mode.

An initial transmission 1220, that includes a first command 1202 may be initiated in the I3C SDR mode. In one example, the first command 1202 includes a common command code (CCC) that causes one or more devices coupled to the serial bus to be operated in HDR-DDR mode. A second command 1204 is transmitted in HDR-DDR mode to select a bus width and other parameters for a first transaction 1206 to be executed in the HDR-DDR mode. In the illustrated example, the second command 1204 causes data to be transmitted over the serial bus and one additional wire. The first transaction 1206 may include transmission of a number (N) of 16-bit data words followed by a CRC word. In some instances, the one or more devices may remain in the HDR-DDR mode and/or may continue to use the selected bus width until one or more new commands are transmitted that cause the one or more devices to modify mode of operation and/or bus width.

In some implementations, the number of wires used by devices may be preconfigured during manufacture, assembly and/or system configuration. In at least some instances, commands may be transmitted to modify preconfigured definitions of bus width.

A third command 1208 is transmitted in HDR-DDR mode to select a bus width and other parameters for a second transaction 1210 to be executed in the HDR-DDR mode. In the illustrated example, the third command 1208 causes data to be transmitted over the serial bus and three additional wires. The second transaction 1210 may include transmission of a number (M) of 16-bit data words followed by a CRC word. A fourth command 1212 is transmitted in HDR-DDR mode to select a bus width and other parameters for a third transaction 1214 to be executed in the HDR-DDR mode. In the illustrated example, the fourth command 1212 causes data to be transmitted over the serial bus and no additional wires. The second transaction 1210 may include transmission of a number (K) of 16-bit data words followed by a CRC word.

Figure 13:
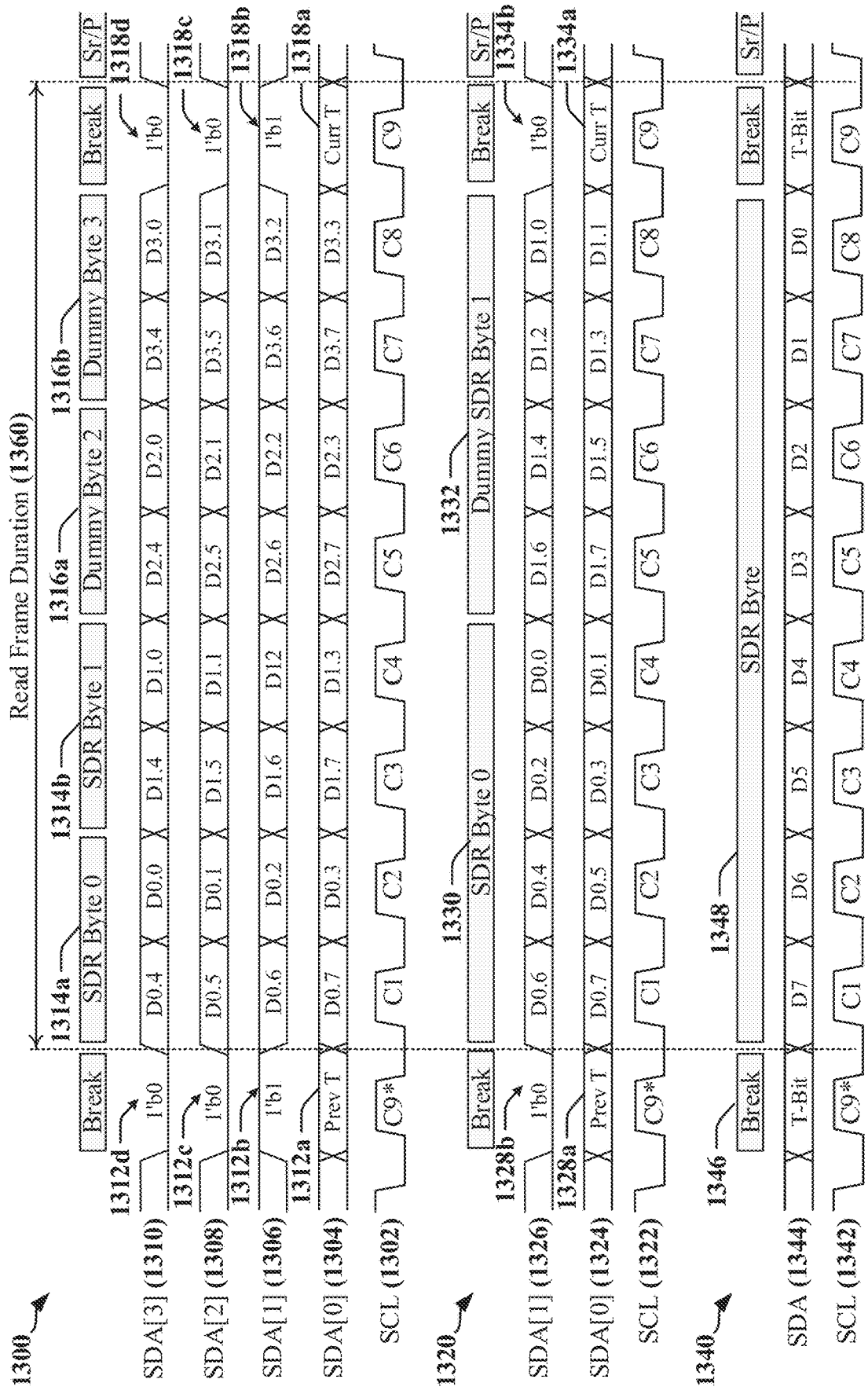
FIG. 13 illustrates padding used in a read frame to maintain bus cadence when a serial bus is operated in accordance with certain aspects disclosed herein.

FIG. 13 illustrates examples 1300, 1320, 1340 in which padding may be used to maintain bus cadence when a serial bus is operated in accordance with an I3C SDR protocol. The examples 1300, 1320, 1340 relate to transmissions of read frames transmitted when a slave device is read by a bus master device in accordance with the I3C SDR protocol. In each example, 1300, 1320, 1340 a common transaction and/or frame duration 1360 is maintained, regardless of the number of bytes available for transmission.

In a first example 1340, no additional wires are used and communication proceeds using two wires (SCL 1342 and SDA 1344). A serialized data byte 1348 may be transmitted after a T-bit at the breaking point 1346. The two-wire implementation represented in the first example 1340 defines the bus cadence for multilane implementations.

In the second example 1320, one additional wire is used and communication proceeds using three wires (SCL 1322, SDA[0] 1324 and SDA[1] 1326). In this example 1320, one data byte 1330 is transmitted followed by a second dummy data byte 1332 that is transmitted as padding to maintain the frame duration 1360. The data bytes 1330, 1332 may be transmitted after a T-Bit 1328a of the preceding frame, which is transmitted on SDA [0] 1324 and before the T-Bit 1334a is transmitted on SDA[0] 1324.

In the third example 1300, three additional wires are used and communication proceeds using five wires (SCL 1302, SDA[0] 1304, SDA[0] 1306 and SDA[1] 1308). In this example 1300, two data bytes 1314a, 1314b are transmitted followed by two dummy data bytes 1316a, 1316b, which are transmitted as padding to maintain the frame duration 1360. The data bytes 1314a, 1314b, 1316a, 1316b may be transmitted after a T-Bit 1312a of the preceding frame, which is transmitted on SDA[0] 1304 and before the T-Bit 1318a is transmitted on SDA[0] 1304.

Certain bit slots 1312b, 1312c, 1312d, 1318b, 1318c, 1318d, 1328b, 1334b on additional wires (SDA[i] 1306, 1308, 1310, 1326) corresponding to control bits 1312a, 1318a, 1328a, 1334a transmitted on the primary data wires (SDA 1304, 1324) may be used to indicate validity of additional bytes transmitted in a multilane frame. In one example, bit slots 1312b, 1312c, 1312d, 1328b in a preceding frame may be used to indicate whether additional bytes 1314b 1316a, 1316b, 1332 are valid or invalid. In this example, the bit slots 1312c, 1312d, 1332b carry a 1'b0 value to indicate those additional bytes 1316a, 1316b, 1332 that carry invalid or dummy bits, while the bit slot 1312b carries a 1'b1 value to indicate the additional byte 1314b that carries valid data. The bit slots 1318b, 1312c, 1318d, 1334b in the current frame may be used to indicate validity of the byte in the next-transmitted frame, except where the current frame is the last frame transmitted. When the current frame is the last frame transmitted, the slots 1318b, 1312c, 1318d, 1334b in the current frame repeat the values transmitted in the corresponding bit slots 1312b, 1312c, 1312d, 1328b in the preceding frame.

The common frame duration 1360 enables a consistent bus cadence to be defined and maintained on a multilane serial bus. A multilane serial bus can provide significant throughput advantages, particularly for large blocks of data transfers. Some efficiency may be lost when frames are transmitted without a full data payload when, for example, there is insufficient data available for transmission to fill all bytes transmitted in a frame. In such circumstances, the latter portion of a data payload in a frame carries no useful information and yet can consume a number of clock cycles, leading to increased latency and reduced throughput.

Figure 14:
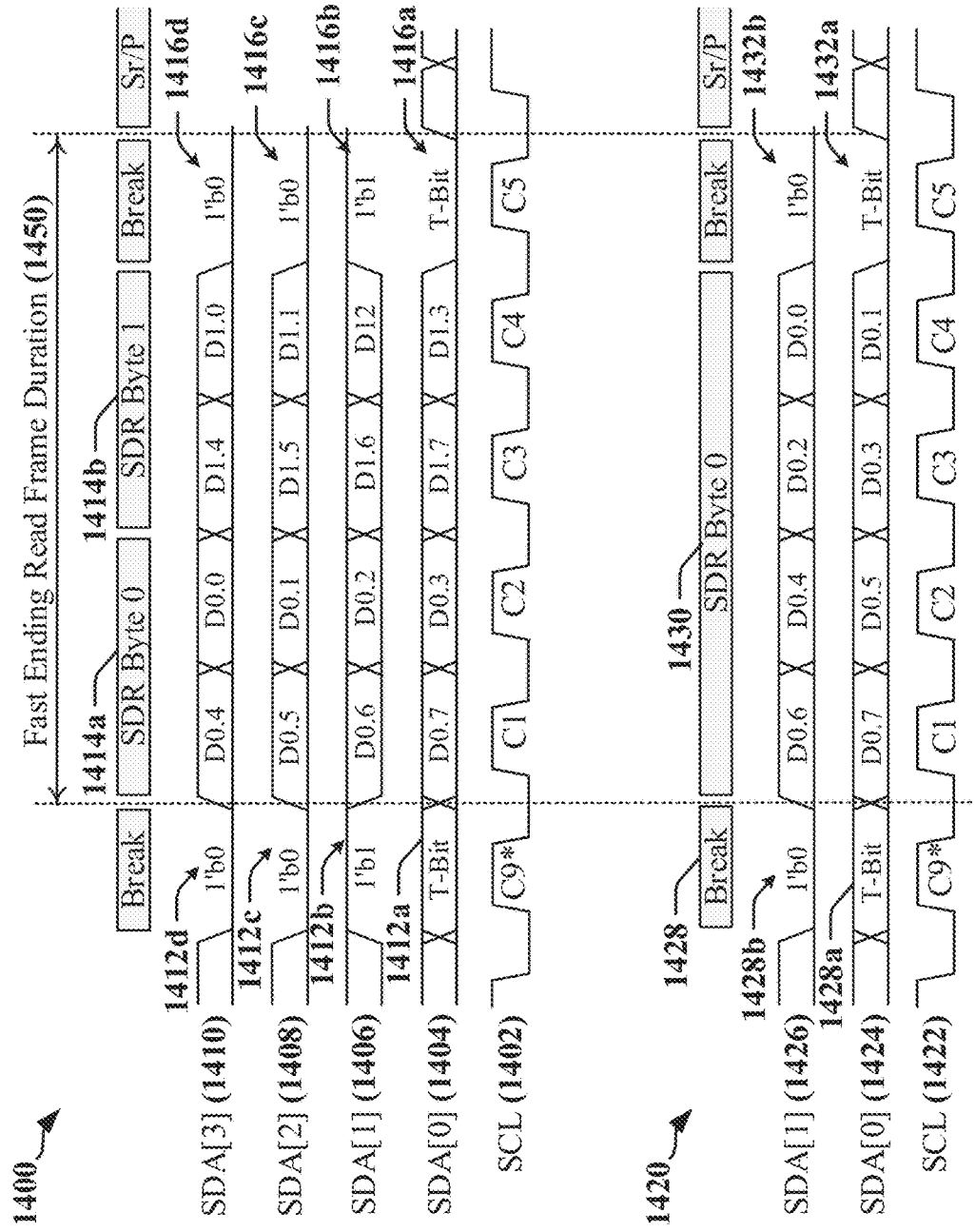
FIG. 14 illustrates early termination of read frames in accordance with certain aspects disclosed herein.

FIG. 14 illustrates examples 1400, 1420 in which frames may be terminated early in accordance with certain aspects disclosed herein. In the examples 1400, 1420, a multilane serial bus is operated in accordance with an I3C SDR protocol.

Certain bit slots 1412b, 1412c, 1412d, 1416b, 1416c, 1416d, 1428b, 1432b on additional wires (SDA[i] 1406, 1408, 1410, 1426) corresponding to control bits 1412a, 1416a, 1428a, 1432a transmitted on the primary data wires (SDA 1404, 1424) may be used to indicate the point at which a multilane frame may be terminated. In one example, bit slots 1412b, 1412c, 1412d, 1428b in a preceding frame may be used to indicate whether additional bytes are valid or invalid. Termination occurs before the first invalid byte is to be transmitted. In this example, the bit slots 1412c, 1412d, 1432b carry a 1'b0 value to indicate that no valid data is available for transmission in corresponding additional byte slots. Each additional byte slot 1414b that is allocated a valid byte of data is indicated by a 1'b1 value in the corresponding bit slot 1412b.

When all valid bytes have been transmitted, transmission is terminated with the transmission of T-bit 1416a, 1432a on SDA[0] 1404, 1424 respectively. The bit slots 1416b, 1416c, 1416d, 1432b in the current frame repeat the values transmitted in the corresponding bit slots 1412b, 1412c, 1412d, 1428b in the preceding frame. The master device transmits a STOP condition or Repeated START to formally terminate the transaction.

Figure 15:
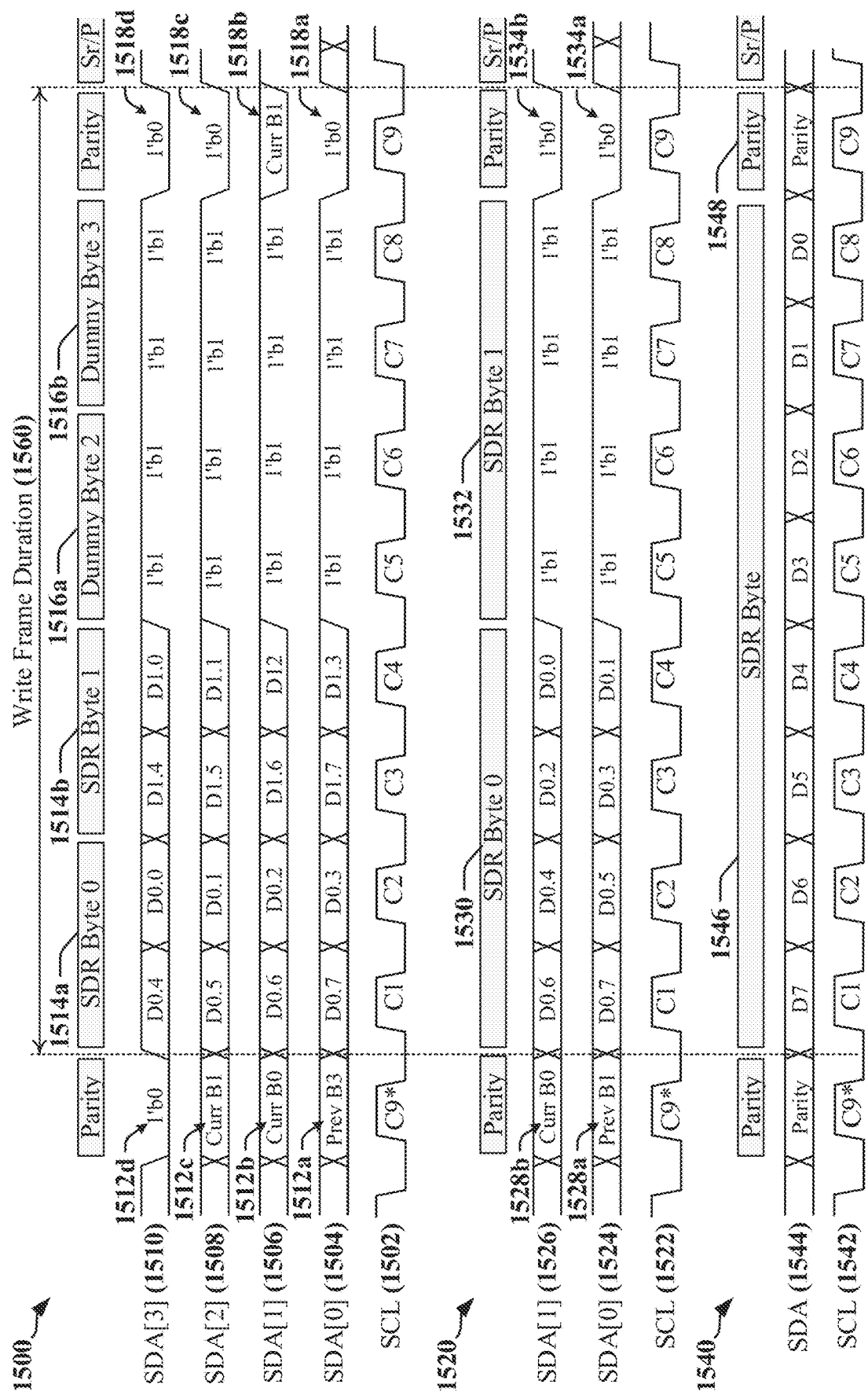
FIG. 15 illustrates padding used in a write frame to maintain bus cadence when a serial bus is operated in accordance with certain aspects disclosed herein.

FIG. 15 illustrates examples 1500, 1520, 1540 in which padding may be used to maintain bus cadence in a serial bus operated in accordance with an I3C SDR protocol when write frames are transmitted by a bus master device to a slave device. In each example, 1500, 1520, 1540 a common transaction and/or frame duration 1560 Parity is maintained, regardless of the number of bytes available for transmission.

In a first example 1540, no additional wires are used and communication proceeds using two wires (SCL 1542 and SDA 1544). A serialized data byte 1546 may be transmitted with a parity bit 1548. The two-wire implementation represented in the first example 1540 defines the bus cadence for multilane implementations.

In the second example 1520, one additional wire is used and communication proceeds using three wires (SCL 1522, SDA[0] 1524 and SDA[1] 1526). In this example 1520, one data byte 1530 is transmitted followed by a second dummy data byte 1532 that is transmitted as padding to maintain the frame duration 1560. Parity for the first byte 1530 is transmitted in bit slot 1528b on SDA[1] 1526 concurrently with parity for the last byte of the previous frame, which is transmitted in bit slot 1528a on SDA[0] 1524. Parity for the second byte 1532 is not required since the second byte 1532 is a dummy byte filled with padding bits. In the illustrated example, the bit slots 1534a, 1534b for the current frame are filled with the value 1'b0.

In the third example 1500, three additional wires are used and communication proceeds using five wires (SCL 1502, SDA[0] 1504, SDA[0] 1506 and SDA[1] 1508). In this example 1500, two data bytes 1514a, 1514b are transmitted 1530 followed by two dummy data bytes 1516a, 1516b, which are transmitted as padding to maintain the frame duration 1560. Parity for the first byte 1514a is transmitted in bit slot 1512b on SDA[1] 1508 concurrently with parity for the second byte 1514b transmitted in bit slot 1512c on SDA[2] 1508 and parity for the last byte of the previous frame transmitted in bit slot 1512a on SDA[0] 1504. Parity for the last transmitted valid byte (second byte 1514b) is transmitted in bit slot 1518b on SDA[1] 1508 at the end of the frame while each of the other parity slots 1518a, 1518c, 1518d is filled with the value 1'b0.

Parity bit slots 1512b, 1512c, 1512d, 1518b, 1518c, 1518d, 1528b, 1534b on additional wires (SDA[i] 1506, 1508, 1510, 1526) may be used to indicate validity of additional bytes transmitted in a multilane frame.

Figure 16:
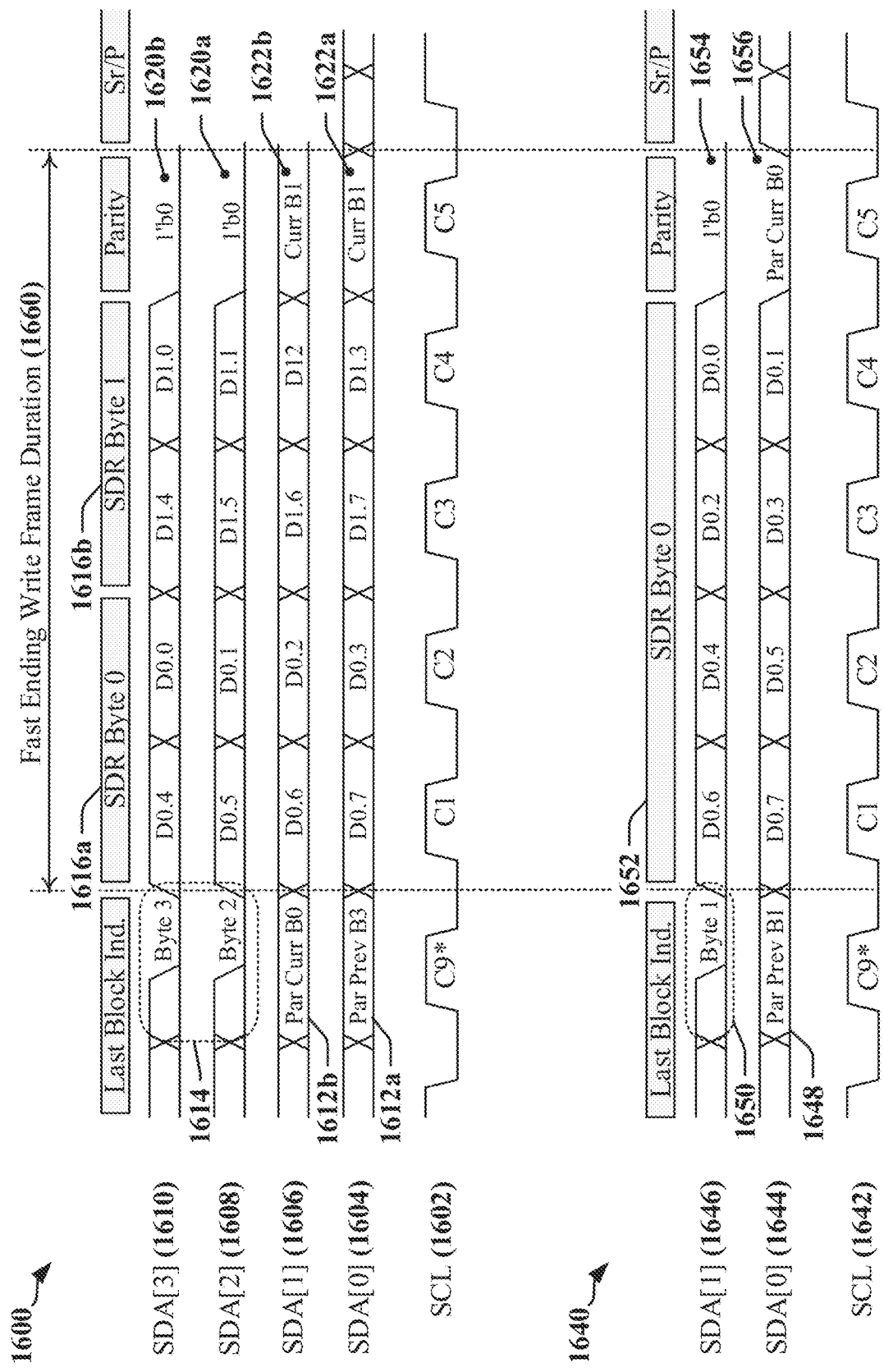
FIG. 16 illustrates first examples of early termination of write frames in accordance with certain aspects disclosed herein.

FIG. 16 illustrates examples 1600, 1640 in which frames may be terminated early in accordance with certain aspects disclosed herein. In the examples 1600, 1640, a multilane serial bus is operated in accordance with an I3C SDR protocol.

Certain bit slots 1614, 1650 on additional wires (SDA[i] 1608, 1610, 1646) may be used to indicate invalid or dummy bytes and, accordingly, the point at which a multilane frame may be terminated. Other bit slots 1612a, 1612b, 1648 carry parity per I3C SDR specifications. Bit slots 1612a, 1648 provided on transmitted on SDA[0] 1604, 1644 in a preceding frame may provide parity for the last byte of the preceding frame. One or more parity bits 1612b may be transmitted in the preceding frame when more than one valid data byte is transmitted in the frame. The remaining parity bit slots 1614, 1650 are used to indicate invalid bytes, which further indicate termination point for the current frame. In one example, invalid additional bytes are indicated when the corresponding SDA 1608, 1610, 1646 transitions while SCL 1602, 1642 is in a high signaling state.

Termination occurs before the first invalid byte is to be transmitted. In these examples 1600, 1640, the parity bit slots 1622a, 1656 carry parity for the last transmitted byte 1616b, 1652. In the first example 1600, the remaining parity bit slots 1622b, 1620a, 1620b are used for parity of respective additional bytes. In this example, parity bits slots 1620a, 1620b for invalid bits may be set to 1'b0. The allocation of parity bits is illustrated further in the first example 1700 of FIG. 17.

Figure 17:
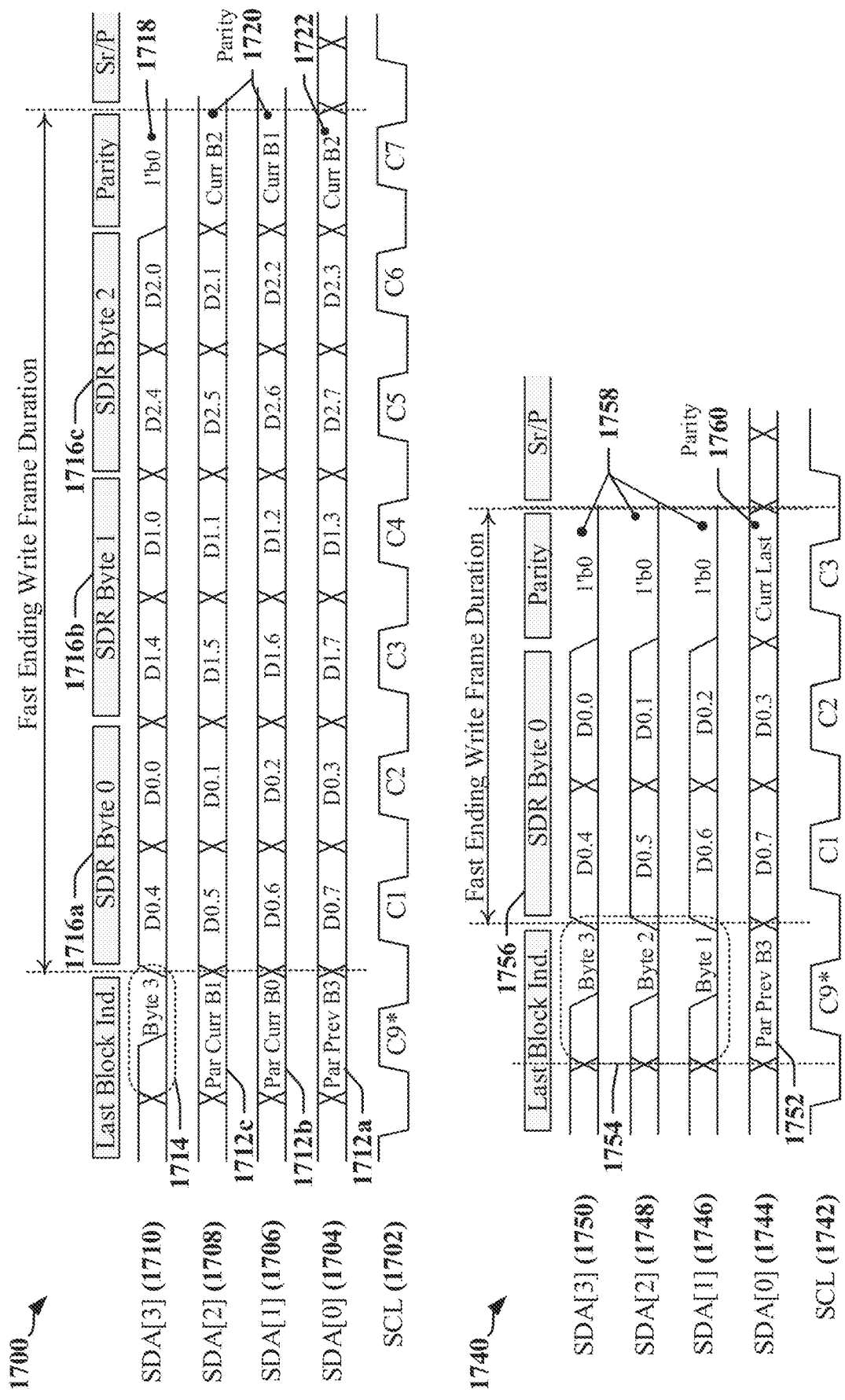
FIG. 17 illustrates second examples of early termination of write frames in accordance with certain aspects disclosed herein.

FIG. 17 illustrates examples 1700, 1740 in which frames transmitted over a 5-wire serial bus may be terminated early in accordance with certain aspects disclosed herein. In the examples 1700, 1740, a multilane serial bus is operated in accordance with an I3C SDR protocol. Certain bit slots 1714, 1754 on additional wires (SDA[i] 1708, 1746, 1748, 1750) may be used to indicate invalid or dummy bytes and, accordingly, the point at which a multilane frame may be terminated. Other bit slots 1712a, 1712b, 1712c, 1752 carry parity per I3C SDR specifications. Bit slots 1712a, 1752 provided on transmitted on SDA[0] 1704, 1744 in a preceding frame may provide parity for the last byte of the preceding frame. One or more parity bits may be transmitted in bit slots 1712b, 1712c in the preceding frame when more than one valid data byte is transmitted in the frame. The remaining parity bit slots 1714, 1754 are used to indicate invalid bytes, which further indicate termination point for the current frame. In one example, invalid additional bytes are indicated when the corresponding SDA 1710, 1746, 1748, 1750 transitions while SCL 1702, 1742 is in a high signaling state.

Termination occurs before the first invalid byte is to be transmitted. In the examples 1700, 1740, the parity bit slots 1722, 1760 carry parity for the last transmitted byte 1716c, 1756. The remaining parity bit slots 1718, 1758 may be set to 1'b0.

Examples of Processing Circuits and Methods

Figure 18:
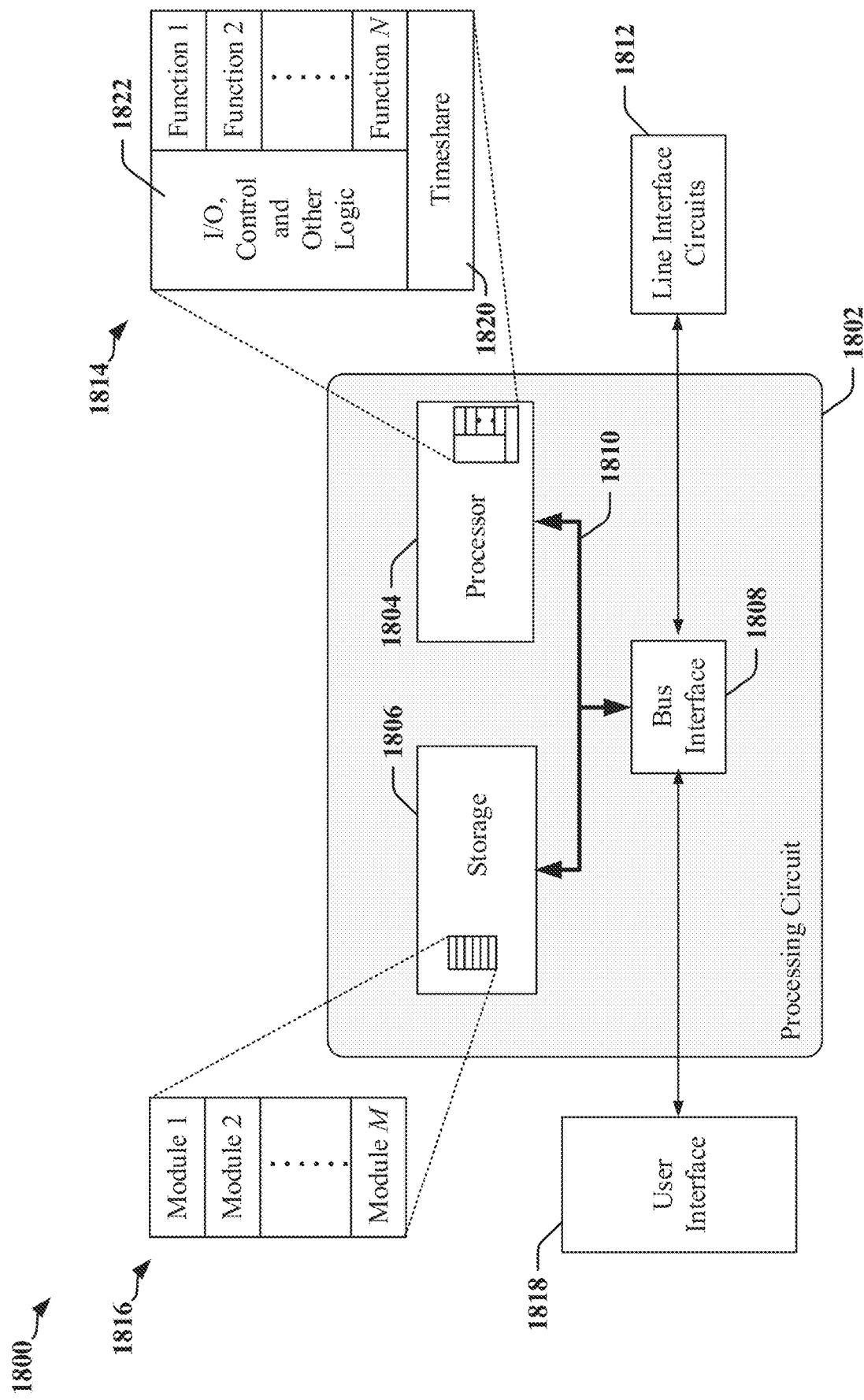
FIG. 18 is a block diagram illustrating an example of an apparatus employing a processing circuit that may be adapted according to certain aspects disclosed herein.

FIG. 18 is a diagram illustrating an example of a hardware implementation for an apparatus 1800 employing a processing circuit 1802 that may be configured to perform one or more functions disclosed herein. In accordance with various aspects of the disclosure, an element, or any portion of an element, or any combination of elements as disclosed herein may be implemented using the processing circuit 1802. The processing circuit 1802 may include one or more processors 1804 that are controlled by some combination of hardware and software modules. Examples of processors 1804 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1804 may include specialized processors that perform specific functions, and that may be configured, augmented or controlled by one of the software modules 1816. The one or more processors 1804 may be configured through a combination of software modules 1816 loaded during initialization, and further configured by loading or unloading one or more software modules 1816 during operation. In various examples, the processing circuit 1802 may be implemented using a state machine, sequencer, signal processor and/or general-purpose processor, or a combination of such devices and circuits.

In the illustrated example, the processing circuit 1802 may be implemented with a bus architecture, represented generally by the bus 1810. The bus 1810 may include any number of interconnecting buses and bridges depending on the specific application of the processing circuit 1802 and the overall design constraints. The bus 1810 links together various circuits including the one or more processors 1804, and storage 1806. Storage 1806 may include memory devices and mass storage devices, and may be referred to herein as computer-readable media and/or processor-readable media. The bus 1810 may also link various other circuits such as timing sources, timers, peripherals, voltage regulators, and power management circuits. A bus interface 1808 may provide an interface between the bus 1810 and one or more transceivers 1812. A transceiver 1812 may be provided for each networking technology supported by the processing circuit. In some instances, multiple networking technologies may share some or all of the circuitry or processing modules found in a transceiver 1812. Each transceiver 1812 provides a means for communicating with various other apparatus over a transmission medium. Depending upon the nature of the apparatus 1800, a user interface 1818 (e.g., keypad, display, speaker, microphone, joystick) may also be provided, and may be communicatively coupled to the bus 1810 directly or through the bus interface 1808.

A processor 1804 may be responsible for managing the bus 1810 and for general processing that may include the execution of software stored in a computer-readable medium that may include the storage 1806. In this respect, the processing circuit 1802, including the processor 1804, may be used to implement any of the methods, functions and techniques disclosed herein. The storage 1806 may be used for storing data that is manipulated by the processor 1804 when executing software, and the software may be configured to implement any one of the methods disclosed herein.

One or more processors 1804 in the processing circuit 1802 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1806 or in an external computer-readable medium. The external computer-readable medium and/or storage 1806 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1806 may also include, by way of example, a carrier wave, a transmission line, and any other suitable medium for transmitting software and/or instructions that may be accessed and read by a computer. Computer-readable medium and/or the storage 1806 may reside in the processing circuit 1802, in the processor 1804, external to the processing circuit 1802, or be distributed across multiple entities including the processing circuit 1802. The computer-readable medium and/or storage 1806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1806 may maintain software maintained and/or organized in loadable code segments, modules, applications, programs, etc., which may be referred to herein as software modules 1816. Each of the software modules 1816 may include instructions and data that, when installed or loaded on the processing circuit 1802 and executed by the one or more processors 1804, contribute to a run-time image 1814 that controls the operation of the one or more processors 1804. When executed, certain instructions may cause the processing circuit 1802 to perform functions in accordance with certain methods, algorithms and processes described herein.

Some of the software modules 1816 may be loaded during initialization of the processing circuit 1802, and these software modules 1816 may configure the processing circuit 1802 to enable performance of the various functions disclosed herein. For example, some software modules 1816 may configure internal devices and/or logic circuits 1822 of the processor 1804, and may manage access to external devices such as the transceiver 1812, the bus interface 1808, the user interface 1818, timers, mathematical coprocessors, and so on. The software modules 1816 may include a control program and/or an operating system that interacts with interrupt handlers and device drivers, and that controls access to various resources provided by the processing circuit 1802. The resources may include memory, processing time, access to the transceiver 1812, the user interface 1818, and so on.

One or more processors 1804 of the processing circuit 1802 may be multifunctional, whereby some of the software modules 1816 are loaded and configured to perform different functions or different instances of the same function. The one or more processors 1804 may additionally be adapted to manage background tasks initiated in response to inputs from the user interface 1818, the transceiver 1812, and device drivers, for example. To support the performance of multiple functions, the one or more processors 1804 may be configured to provide a multitasking environment, whereby each of a plurality of functions is implemented as a set of tasks serviced by the one or more processors 1804 as needed or desired. In one example, the multitasking environment may be implemented using a timesharing program 1820 that passes control of a processor 1804 between different tasks, whereby each task returns control of the one or more processors 1804 to the timesharing program 1820 upon completion of any outstanding operations and/or in response to an input such as an interrupt. When a task has control of the one or more processors 1804, the processing circuit is effectively specialized for the purposes addressed by the function associated with the controlling task. The timesharing program 1820 may include an operating system, a main loop that transfers control on a round-robin basis, a function that allocates control of the one or more processors 1804 in accordance with a prioritization of the functions, and/or an interrupt driven main loop that responds to external events by providing control of the one or more processors 1804 to a handling function.

Figure 19:
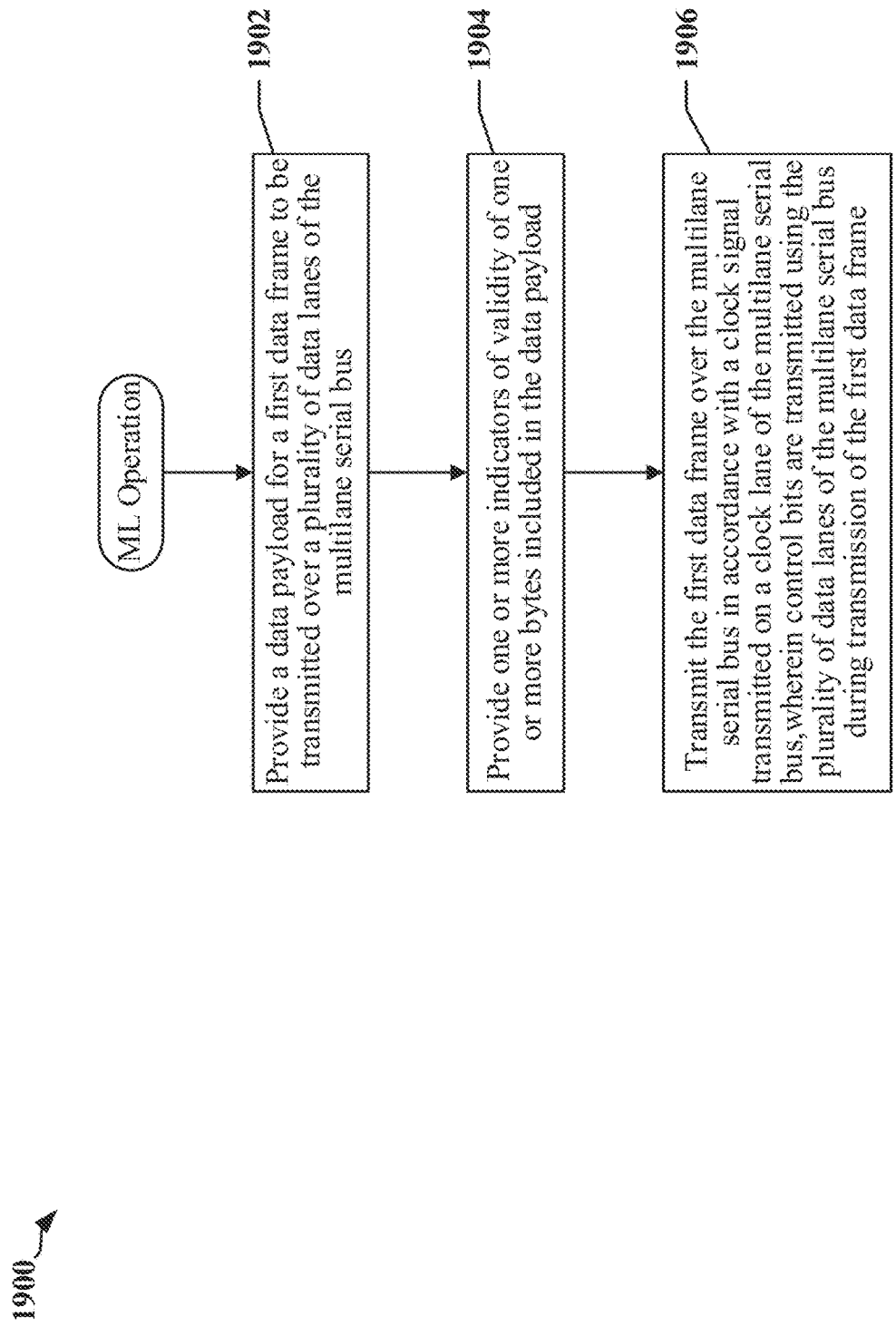
FIG. 19 is a flowchart illustrating a process that may be performed at a sending device coupled to a serial bus in accordance with certain aspects disclosed herein.

FIG. 19 is a flowchart 1900 illustrating a process that may be performed at a device coupled to a multilane serial bus.

At block 1902, the device may provide a data payload for a first data frame to be transmitted over a plurality of data lanes of the multilane serial bus. At block 1904, the device may provide one or more indicators of validity of one or more bytes included in the data payload. At block 1906, the device may transmit the first data frame over the multilane serial bus in accordance with a clock signal transmitted on a clock lane of the multilane serial bus. Control bits may be transmitted using the plurality of data lanes of the multilane serial bus during transmission of the first data frame.

In one example, the first data frame is a read frame. The control bits may include a breakpoint field transmitted after the data payload. One or more repurposed bits may be transmitted concurrently with the breakpoint field.

In certain examples, the first data frame is a read frame, the control bits include a breakpoint field, and the one or more indicators of validity are transmitted while the breakpoint field is transmitted in a preceding second data frame. The breakpoint field may be transmitted on a first data lane to terminate the preceding second data frame. The device may transmit the one or more indicators of validity on at least one additional data lane concurrently with the breakpoint field.

In certain examples, the first data frame is a write frame and the one or more indicators of validity are transmitted concurrently with parity information prior to transmission of the data payload. The device may transmit parity information for a first byte on a first data lane during a final clock cycle of an immediately preceding second data frame. The device may cause a transition in signaling state on a second data lane during transmission of the parity information for the first byte. The transition in signaling state on the second data lane during transmission of the parity information for the first byte may indicate that one or more bytes are invalid. The absence of a transition on an additional data lane during parity transmission indicates that a corresponding byte is valid.

In certain examples, the multilane serial bus has a primary data lane and three additional data lanes. A fully-loaded data frame carries four bytes as a data payload. The data payload may be provided by providing fewer than four valid data bytes as data payload, and providing the one or more indicators by causing a transition in signaling state on at least one data lane during transmission of parity information in an immediately preceding second data frame. The data payload may be provided by providing fewer than four valid data bytes as data payload, and providing the one or more indicators by causing a transition in signaling state on at least one data lane during transmission of a breakpoint field in an immediately preceding second data frame. The device may terminate transmission of the first data frame after transmitting the fewer than four valid data bytes.

Figure 20:
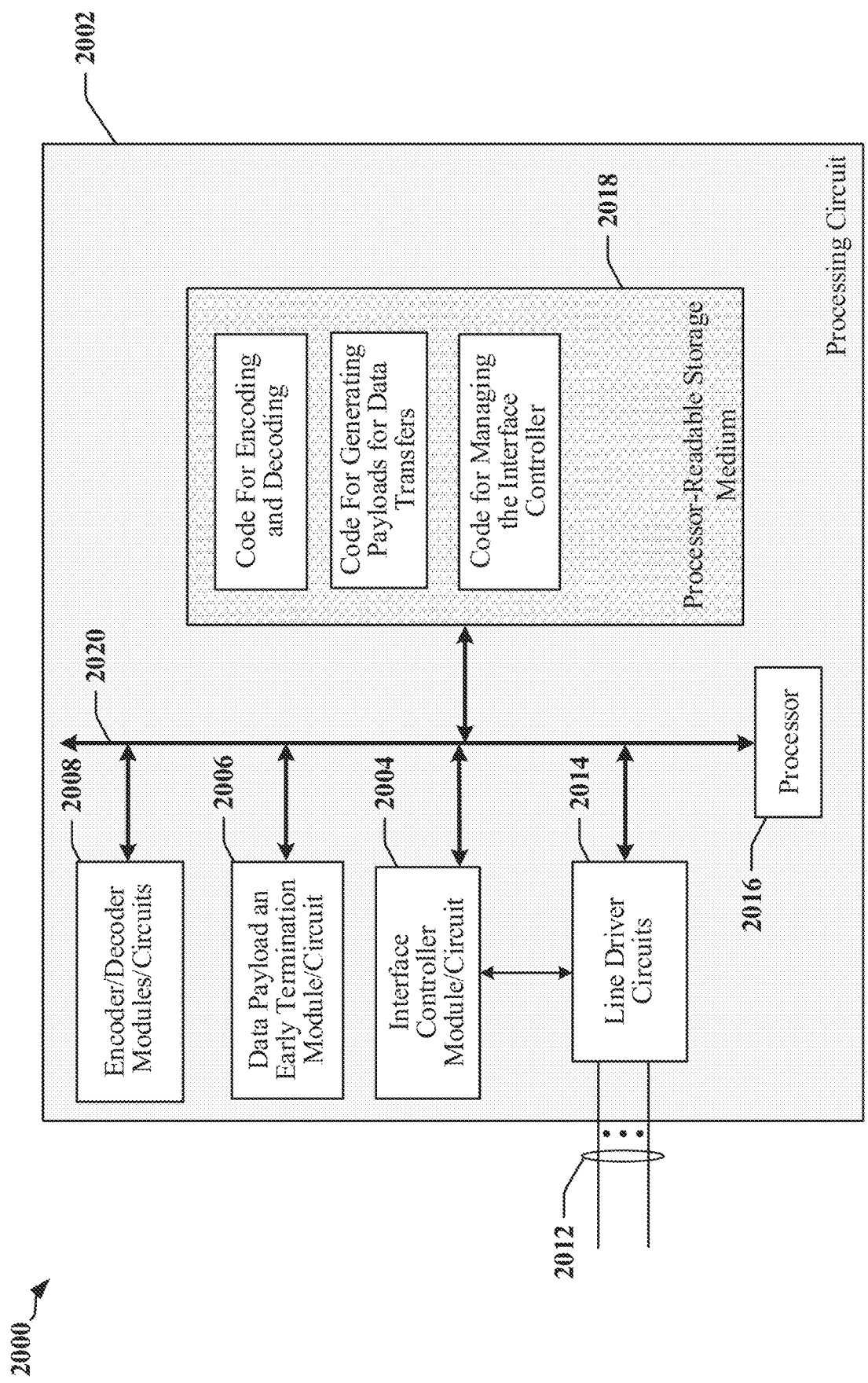
FIG. 20 illustrates a hardware implementation for a transmitting apparatus adapted to respond to support multi-lane operation of a serial bus in accordance with certain aspects disclosed herein.

FIG. 20 is a diagram illustrating a simplified example of a hardware implementation for an apparatus 2000 employing a processing circuit 2002. The processing circuit typically has a controller or processor 2016 that may include one or more microprocessors, microcontrollers, digital signal processors, sequencers and/or state machines. The processing circuit 2002 may be implemented with a bus architecture, represented generally by the bus 2020. The bus 2020 may include any number of interconnecting buses and bridges depending on the specific application of the processing circuit 2002 and the overall design constraints. The bus 2020 links together various circuits including one or more processors and/or hardware modules, represented by the controller or processor 2016, the modules or circuits 2004, 2006 and 2008, and the processor-readable storage medium 2018. The apparatus may be coupled to a multi-lane communication link using a physical layer circuit 2014. The physical layer circuit 2014 may operate the multi-lane communication link 2012 to support communications in accordance with I3C protocols. The bus 2020 may also link various other circuits such as timing sources, peripherals, voltage regulators, and power management circuits, which are well known in the art, and therefore, will not be described any further.

The processor 2016 is responsible for general processing, including the execution of software, code and/or instructions stored on the processor-readable storage medium 2018. The processor-readable storage medium 2018 may include a non-transitory storage medium. The software, when executed by the processor 2016, causes the processing circuit 2002 to perform the various functions described supra for any particular apparatus. The computer-readable storage medium may be used for storing data that is manipulated by the processor 2016 when executing software. The processing circuit 2002 further includes at least one of the modules 2004, 2006 and 2008. The modules 2004, 2006 and 2008 may be software modules running in the processor 2016, resident/stored in the processor-readable storage medium 2018, one or more hardware modules coupled to the processor 2016, or some combination thereof. The modules 2004, 2006 and 2008 may include microcontroller instructions, state machine configuration parameters, or some combination thereof.

In one configuration, the apparatus 2000 includes an interface controller 2004, and line driver circuits 2014 including a first line driver coupled to a first wire of a multi-lane serial bus and a second line driver coupled to a second wire of the multi-lane serial bus 2012. The apparatus 2000 may include modules and/or circuits 2004, 2008, 2014 configured to transmit first data over the serial bus while the serial bus 2012 is configured for a DDR mode of operation. The apparatus 2000 may include modules and/or circuits 2006 configured to generate data payloads and control information operable to cause early termination of data frames.

The apparatus 2000 may include a processor 2016 configured to provide a data payload for a first data frame to be transmitted over a plurality of data lanes of a multilane serial bus, provide one or more indicators of validity of one or more bytes included in the data payload, and transmit the first data frame over the multilane serial bus in accordance with a clock signal transmitted on a clock lane of the multilane serial bus. Control bits may be transmitted using the plurality of data lanes of the multilane serial bus during transmission of the first data frame.

The first data frame may be a read frame. The control bits may include a breakpoint field transmitted after the data payload. In one example, one or more repurposed bits may be transmitted concurrently with the breakpoint field. In one example, the one or more indicators of validity are transmitted while the breakpoint field is transmitted in a preceding second data frame. The processor 2016 may be configured to transmit the breakpoint field on a first data lane to terminate the preceding second data frame, and transmit the one or more indicators of validity on at least one additional data lane concurrently with the breakpoint field.

The first data frame may be a write frame the control bits comprise parity information. In one example, the one or more indicators of validity are transmitted concurrently with the parity information and prior to transmission of the data payload. The processor 2016 may be configured to transmit the parity information for a first byte on a first data lane during a final clock cycle of an immediately preceding second data frame, and cause a transition in signaling state on a second data lane during transmission of the parity information for the first byte. The transition in signaling state on the second data lane during transmission of the parity information for the first byte may indicate that one or more bytes are invalid. Absence of a transition on an additional data lane during parity transmission may indicate that a corresponding data byte is valid.

In some instances, the multilane serial bus includes a primary data lane and three additional data lanes, and a fully-loaded data frame carries four bytes as a data payload. The processor 2016 may be configured to provide fewer than four valid data bytes as the data payload, and provide the one or more indicators of validity by causing a transition in signaling state on at least one data lane during transmission of parity information in an immediately preceding second data frame. The processor 2016 may be configured to provide fewer than four valid data bytes as the data payload, and provide the one or more indicators of validity by causing a transition in signaling state on at least one data lane during a breakpoint field in an immediately preceding second data frame. The processor 2016 may be configured to terminate transmission of the first data frame after transmitting the fewer than four valid data bytes. The multilane serial bus may be operated in accordance with an I3C single data rate protocol.

The processor-readable storage medium 2018 may store one or more instructions related to multilane communications. The instructions, when executed by at least one processor 2016 of a processing circuit 2002, cause the processing circuit 2002 to provide a data payload for a first data frame to be transmitted over a plurality of data lanes of a multilane serial bus, provide one or more indicators of validity of one or more bytes included in the data payload, and transmit the first data frame over the multilane serial bus in accordance with a clock signal transmitted on a clock lane of the multilane serial bus. Control bits may be transmitted using the plurality of data lanes of the multilane serial bus during transmission of the first data frame.

In one example, the first data frame is a read frame. The control bits may include a breakpoint field transmitted before or after the data payload and one or more repurposed bits may be transmitted concurrently with the breakpoint field.

In one example, the first data frame is a write frame. The control bits may include parity information, and the one or more indicators of validity may be transmitted concurrently with the parity information and prior to transmission of the data payload.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method for communicating on a multilane serial bus, comprising:
   providing a data payload for a first data frame to be transmitted over a plurality of data lanes of the multilane serial bus;
   providing one or more indicators of validity of one or more bytes included in the data payload by causing a transition in signaling state on at least one data lane during transmission of parity information in an immediately preceding second data frame; and
   transmitting the first data frame over the multilane serial bus in accordance with a clock signal transmitted on a clock lane of the multilane serial bus, wherein control bits are transmitted using the plurality of data lanes of the multilane serial bus during transmission of the first data frame.

2. The method of claim 1, wherein the first data frame is a read frame, wherein the control bits comprise a breakpoint field transmitted after the data payload, and wherein one or more repurposed bits transmitted concurrently with the breakpoint field.

3. The method of claim 1, wherein the first data frame is a read frame, wherein the control bits comprise a breakpoint field, and wherein the one or more indicators of validity are transmitted while the breakpoint field is transmitted in the immediately preceding second data frame.

4. The method of claim 3, further comprising:
transmitting the breakpoint field on a first data lane to terminate the immediately preceding second data frame; and
transmitting the one or more indicators of validity on at least one additional data lane concurrently with the breakpoint field.

5. The method of claim 1, wherein the first data frame is a write frame, and wherein the control bits comprise the parity information.

6. The method of claim 5, further comprising:
transmitting the parity information for a first byte on a first data lane during a final clock cycle of the immediately preceding second data frame; and
causing the transition in signaling state on a second data lane during the transmission of the parity information for the first byte.

7. The method of claim 6, wherein the transition in signaling state on the second data lane during the transmission of the parity information for the first byte indicates that one or more bytes are invalid.

8. The method of claim 6, wherein absence of transition in signaling state on an additional data lane during the transmission of the parity information indicates that a corresponding data byte is valid.

9. The method of claim 1, wherein the multilane serial bus comprises a primary data lane and three additional data lanes, wherein a fully-loaded data frame carries four bytes as its payload, further comprising:
terminating the transmission of the first data frame after transmitting fewer than four valid data bytes.

10. The method of claim 9, wherein providing the one or more indicators of validity comprises:
providing less than four valid data bytes as the data payload.

11. The method of claim 9, wherein providing the one or more indicators of validity comprises:
providing less than four valid data bytes as the data payload; and
providing the one or more indicators of validity by causing a transition in signaling state on at least one data lane during transmission of a breakpoint field in the immediately preceding second data frame.

12. The method of claim 1, wherein a first data lane of the multilane serial bus is operated in accordance with an I3C single data rate protocol.

13. An apparatus operable to communicate over a multilane serial bus, comprising:
a bus interface configured to couple the apparatus to the multilane serial bus; and
a processor configured to:
provide a data payload for a first data frame to be transmitted over a plurality of data lanes of the multilane serial bus;
provide one or more indicators of validity of one or more bytes included in the data payload by causing a transition in signaling state on at least one data lane during transmission of parity information in an immediately preceding second data frame; and
transmit the first data frame over the multilane serial bus in accordance with a clock signal transmitted on a clock lane of the multilane serial bus, wherein control bits are transmitted using the plurality of data lanes of the multilane serial bus during transmission of the first data frame.

14. The apparatus of claim 13, wherein the first data frame is a read frame, wherein the control bits comprise a breakpoint field transmitted after the data payload, and wherein one or more repurposed bits transmitted concurrently with the breakpoint field.

15. The apparatus of claim 13, wherein the first data frame is a read frame, wherein the control bits comprise a breakpoint field, and wherein the one or more indicators of validity are transmitted while the breakpoint field is transmitted in the immediately preceding second data frame.

16. The apparatus of claim 15, wherein the processor is further configured to:
transmit the breakpoint field on a first data lane to terminate the immediately preceding second data frame; and
transmit the one or more indicators of validity on at least one additional data lane concurrently with the breakpoint field.

17. The apparatus of claim 13, wherein the first data frame is a write frame, and wherein the control bits comprise the parity information.

18. The apparatus of claim 17, wherein the processor is further configured to:
transmit the parity information for a first byte on a first data lane during a final clock cycle of the immediately preceding second data frame; and
cause the transition in signaling state on a second data lane during the transmission of the parity information for the first byte.

19. The apparatus of claim 18, wherein the transition in signaling state on the second data lane during the transmission of the parity information for the first byte indicates that one or more bytes are invalid.

20. The apparatus of claim 18, wherein absence of transition in signaling state on an additional data lane during the transmission of the parity information indicates that a corresponding data byte is valid.

21. The apparatus of claim 13, wherein the multilane serial bus comprises a primary data lane and three additional data lanes, wherein a fully-loaded data frame carries four bytes as its payload, and wherein the processor is further configured to:
terminate the transmission of the first data frame after transmitting fewer than four valid data bytes.

22. The apparatus of claim 21, wherein the processor is further configured to:
provide less than four valid data bytes as the data payload.

23. The apparatus of claim 21, wherein the processor is further configured to:
provide less than four valid data bytes as the data payload; and
provide the one or more indicators of validity by causing a transition in signaling state on at least one data lane during transmission of a breakpoint field in the immediately preceding second data frame.

24. The apparatus of claim 13, wherein a first data lane of the multilane serial bus is operated in accordance with an I3C single data rate protocol.

25. An apparatus operable to communicate over a multilane serial bus, comprising:

means for providing a data payload for a first data frame to be transmitted over a plurality of data lanes of the multilane serial bus;

means for providing one or more indicators of validity of one or more bytes included in the data payload, configured to provide the one or more indicators by causing a transition in signaling state on at least one data lane during transmission of parity information in an immediately preceding second data frame; and means for transmitting the first data frame over the multilane serial bus in accordance with a clock signal transmitted on a clock lane of the multilane serial bus, wherein control bits are transmitted using the plurality of data lanes of the multilane serial bus during transmission of the first data frame.

26. A non-transitory processor-readable storage medium having one or more instructions related to multilane communications which, when executed by at least one processor of a processing circuit, cause the processing circuit to:

provide a data payload for a first data frame to be transmitted over a plurality of data lanes of a multilane serial bus;

provide one or more indicators of validity of one or more bytes included in the data payload by causing a transition in signaling state on at least one data lane during transmission of parity information in an immediately preceding second data frame; and transmit the first data frame over the multilane serial bus in accordance with a clock signal transmitted on a clock lane of the multilane serial bus, wherein control bits are transmitted using the plurality of data lanes of the multilane serial bus during transmission of the first data frame.

27. The processor-readable storage medium of claim 26, wherein the first data frame is a read frame, wherein the control bits comprise a breakpoint field transmitted before or after the data payload, and wherein one or more repurposed bits are transmitted concurrently with the breakpoint field.

28. The processor-readable storage medium of claim 26, wherein the first data frame is a write frame, and wherein the control bits comprise the parity information.

29. The processor-readable storage medium of claim 26, wherein a first data lane of the multilane serial bus is operated in accordance with an I3C single data rate protocol.

* * * * *